United States Patent
Zhang et al.

(10) Patent No.: US 8,830,917 B1
(45) Date of Patent: Sep. 9, 2014

(54) SHORT PREAMBLE IN A PHYSICAL LAYER DATA UNIT

(75) Inventors: Hongyuan Zhang, Fremont, CA (US); Yong Liu, Santa Clara, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 778 days.

(21) Appl. No.: 12/699,702

(22) Filed: Feb. 3, 2010

Related U.S. Application Data

(60) Provisional application No. 61/149,821, filed on Feb. 4, 2009.

(51) Int. Cl.
*H04W 4/00* (2009.01)

(52) U.S. Cl.
USPC .......................................... 370/329; 370/341

(58) Field of Classification Search
USPC ................................................. 370/329, 341
See application file for complete search history.

(56) References Cited

U.S. PATENT DOCUMENTS

| | | | |
|---|---|---|---|
| 2004/0179507 A1* | 9/2004 | Batra et al. ..................... | 370/343 |
| 2008/0192776 A1* | 8/2008 | Fleming et al. ................ | 370/514 |
| 2009/0160707 A1* | 6/2009 | Lakkis .......................... | 342/367 |
| 2009/0285319 A1 | 11/2009 | Zhang et al. | |

FOREIGN PATENT DOCUMENTS

WO WO-2009/084885 A2 7/2009

OTHER PUBLICATIONS

U.S. Appl. No. 12/569,547, filed Sep. 29, 2009, Zhang et al.
Funada et al., "A design of single carrier based PHY for IEEE 802.15.3c standard," The 18th Annual IEEE International Symposium on Personal, Indoor and Mobile Radio Communications (PIMRC'07), *The Institute for Electrical and Electronics Engineers* (2007).
IEEE Std 802.15.3c/D00 (Amendment to IEEE Std 802.15.3-2003) "Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension," *The Institute of Electrical and Electronics Engineers, Inc.* (2008).
IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4.GHZ Band," *The Institute of Electrical and Electronics Engineers, Inc.* (1999).

(Continued)

*Primary Examiner* — Noel Beharry
*Assistant Examiner* — Kodzovi Acolatse

(57) ABSTRACT

In a wireless communication system where communication devices utilize physical layer (PHY) data units that conform to a first format to communicate information associated with a layer of a protocol stack above a media access channel (MAC) layer, where the first format is associated with a first number of symbols in a preamble, a method for generating a PHY data unit that conforms to a second format includes generating a preamble of the PHY data unit, where the preamble includes a second number of symbols, wherein the second number is smaller than the first number; and generating another portion of the PHY data unit.

27 Claims, 17 Drawing Sheets

(56) References Cited

OTHER PUBLICATIONS

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," *The Institute of Electrical and Electronics Engineers, Inc.* (2001).

IEEE Std 802.11a-1999 (Supplement to IEEE Std 802.11-1999) "Supplement to IEEE Standard for Information technology—Telecommunications and information exchange between systems—Local and metropolitan area networks—Specific networks—Part 11: Wireless LAN Medium Access Control (MAC) and Physical Layer (PHY) specifications: High-Speed Physical Layer in the 5 GHZ Band," *The Insititue of Electrical and Eletronics Engineers, Inc.* (1999).

IEEE Std 802.15.3c/D07 (Amendment to IEEE Std 802.15.3-2003) "Draft Amendment to IEEE Standard for Information technology—Telecommunications and information exchange between systems—Local and metropolitan networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension," *The Institute of Electrical and Electronics Engineers, Inc.* (2009).

"IEEE 802.15.3™ Guide Addresses Untapped High-Rate Wireless Personal Area Network (WPAN) Market," *The Institute of Electrical and Electronics Engineers, Inc.*, available at http://standards.ieee.org/announcements/pr_802153wpanguide.html (2004).

S. A. Mujtaba, "IEEE P802.11—Wireless LANS, TGn Sync Proposal Technical Specification," *The Institute of Electrical and Electronics Engineers, Inc.*, doc.: IEEE 802.1-04/0889r6 (2005).

\* cited by examiner

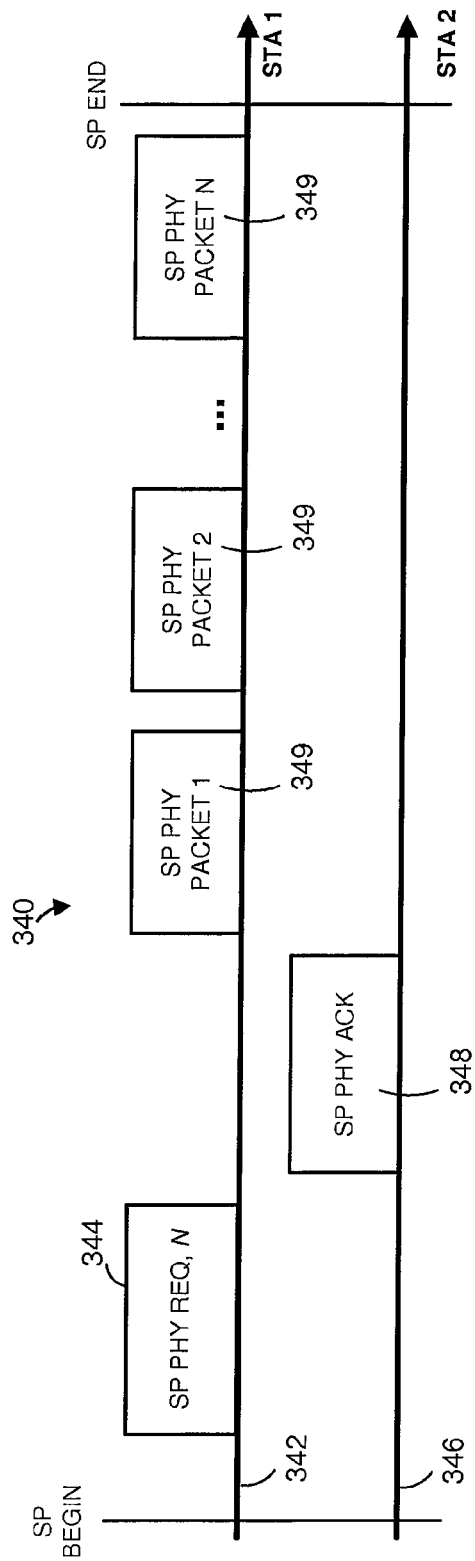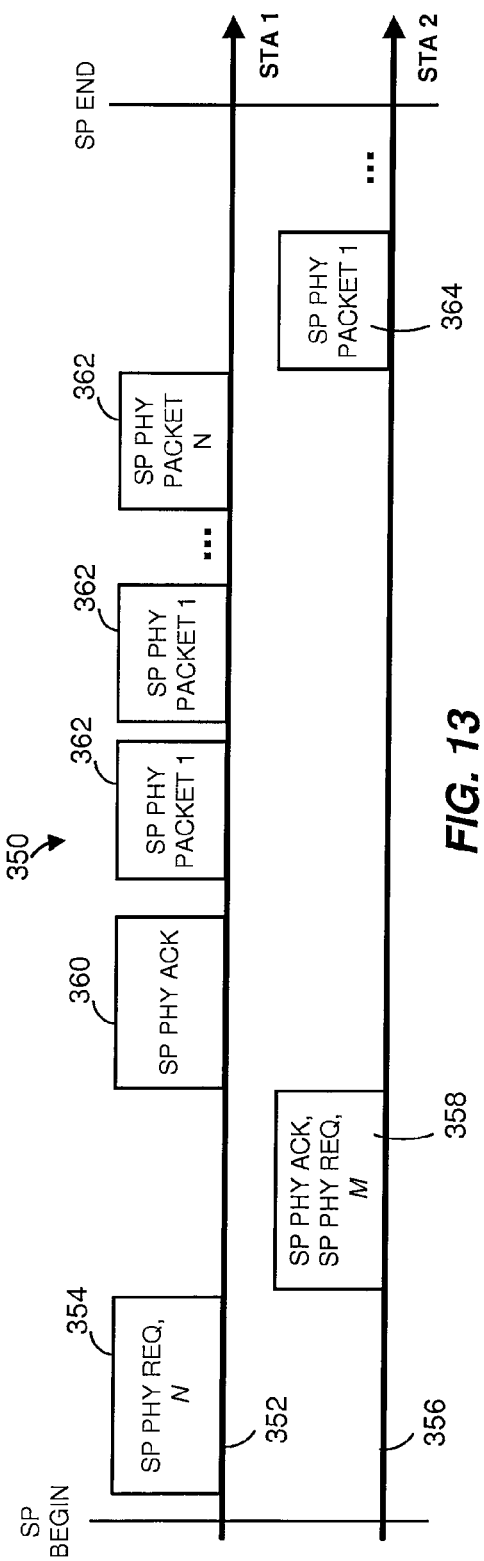

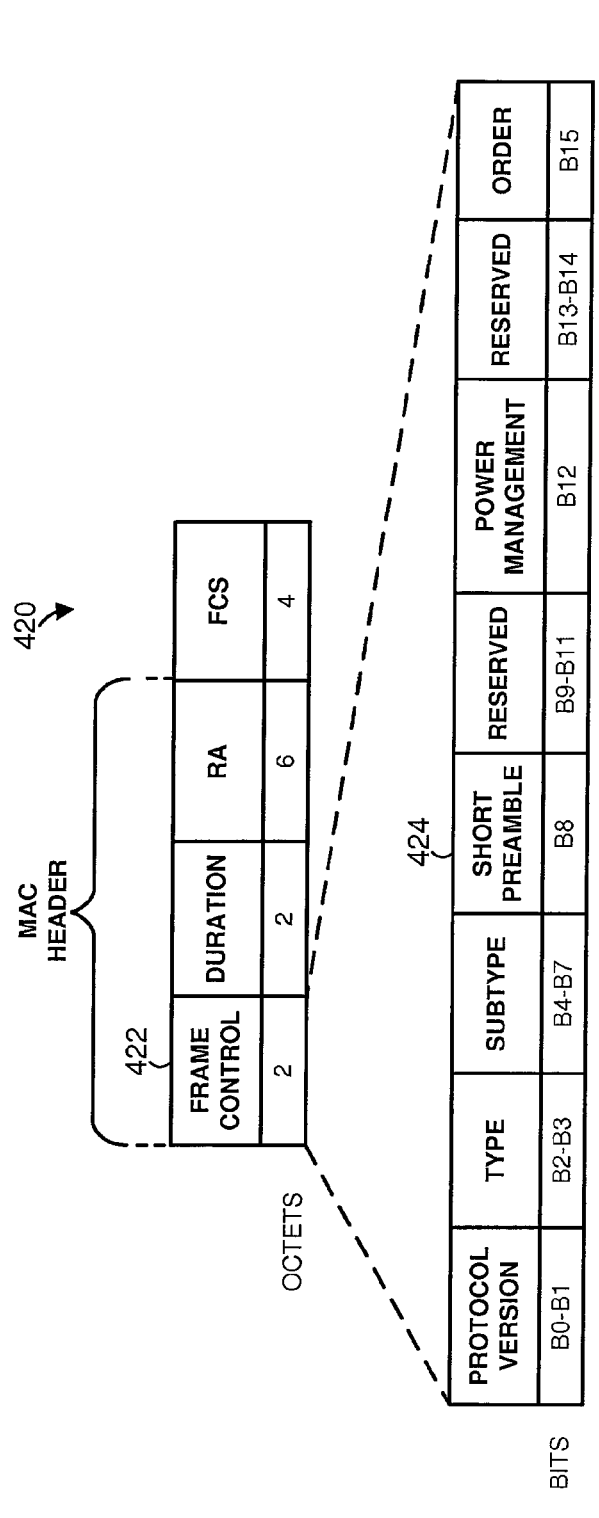
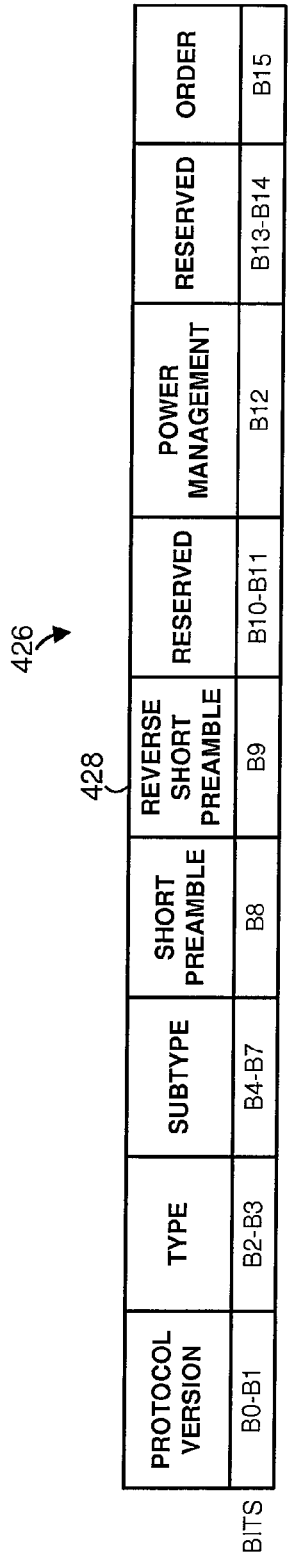
FIG. 19
FIG. 20

SHORT PREAMBLE IN A PHYSICAL LAYER DATA UNIT

CROSS REFERENCE TO RELATED APPLICATION

This application claims the benefit of U.S. Provisional Patent Application No. 61/149,821 filed Feb. 4, 2009, entitled "Short Preamble in 60 GHz Wireless Communication Systems," the entire disclosure of which is hereby expressly incorporated herein by reference.

FIELD OF TECHNOLOGY

The present disclosure relates generally to communication systems and, more particularly, to information formats for exchanging information via communication channels.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An ever-increasing number of relatively inexpensive, low power wireless data communication services, networks and devices have been made available over the past number of years, promising near wire speed transmission and reliability. Various wireless technology is described in detail in the 802 IEEE Standards, including for example, the IEEE Standard 802.11a (1999) and its updates and amendments, the IEEE Standard 802.11n, and the IEEE draft standards 802.15.3, and 802.15.3c now in the process of being finalized, all of which are collectively incorporated herein fully by reference.

As one example, a type of a wireless network known as a wireless personal area network (WPAN) involves the interconnection of devices that are typically, but not necessarily, physically located closer together than wireless local area networks (WLANs) such as WLANs that conform to the IEEE Standard 802.11a or the IEEE draft standard 802.11n. Recently, the interest and demand for particularly high data rates (e.g., in excess of 1 Gbps) in such networks has significantly increased. One approach to realizing high data rates in a WPAN is to use hundreds of MHz, or even several GHz, of bandwidth. For example, the unlicensed 60 GHz band provides one such possible range of operation.

In general, antennas and, accordingly, associated effective wireless channels are highly directional at frequencies near or above 60 GHz. As a result, the distance separating a pair of communicating devices has a significant impact on the data rate that the pair of communication devices can support. Further, when multiple antennas are available at one or both communicating devices, an efficient beam pattern allows the devices to better exploit spatial selectivity of the wireless channel and, accordingly, increase the data rate at which the devices communicate. Generally speaking, beamforming or beamsteering creates a spatial gain pattern having one or more high gain lobes or beams (as compared to the gain obtained by an omni-directional antenna) in one or more particular directions, with reduced the gain in other directions. If the gain pattern for multiple transmit antennas, for example, is configured to produce a high gain lobe in the direction of a receiver, better transmission reliability can be obtained over that obtained with an omni-directional transmission.

Thus, when devices are separated by a relatively large distance, and especially when an efficient beamforming pattern has not yet been applied, the data rate at which these device communicate may measure only tens of Mbps. In some systems, devices communicate at this data rate when the physical layer of the protocol stack is in the so-called control mode operation ("control PHY"). Generally speaking, control PHY of a transmission system corresponds to the lowest data rate supported by each of the devices operating in the transmission system. Devices transmit and receive control PHY frames to communicate basic control information such as beacon data or beamforming data, for example. On the other hand, when beamformed devices are separated by a short distance, a data rate in excess of 1 Gbps can be established. Beamformed devices generally transmit data at the higher data rate using "normal PHY" data units.

In wideband wireless communication systems that operate in the 60 GHz band, packets transmitted via a communication channel generally include a PHY preamble to provide synchronization and training information; a PHY header to provide the basic parameters of the physical layer such as length of the payload, modulation and coding method, etc.; and a PHY payload portion. A PHY preamble consistent with the IEEE 802.15.3c Draft D0.0 Standard, for example, a synchronization field (SYNC) that includes several repetitions of a certain spreading sequence to indicate the beginning of a block of transmitted information, a start frame delimiter (SFD) field to signal the beginning of the actual frame, and a channel estimation sequence (CES) to carry information for receiver algorithms related to automatic gain control (AGC) setting, antenna diversity selection, timing acquisition, coarse frequency recovery, channel estimation, etc.

In such systems, the PHY preamble takes up some of the bandwidth available in the communication link. Further, when the PHY payload of a packet is relatively small, the proportion of the bandwidth occupied by the PHY preamble of the packet can be relatively large.

SUMMARY

In an embodiment, in a wireless communication system in which communication devices utilize physical layer (PHY) data units that conform to a first format to communicate information associated with a layer of a protocol stack above a media access channel (MAC) layer, so that the first format is associated with a first number of symbols in a preamble, a method for generating a PHY data unit that conforms to a second format includes generating a preamble of the PHY data unit, where the preamble includes a second number of symbols, so that the second number is smaller than the first number; and generating another portion of the PHY data unit.

In another embodiment, a communication device for use in a wireless communication system, where the communication device utilizes regular PHY data units to exchange data with other communication devices and control PHY data units to exchange control information with the other communication devices, includes a PHY preamble generator configured to generate a preamble of a regular PHY data unit applying one of a first format and a second format, where the first format includes a first number of symbols and a second format includes a second number of symbols, and where the second number is smaller than the first number; and a format selection controller configured to select one of the first format and the second format, and cause the PHY preamble generator to apply the selected one of the format and the second format.

In another embodiment, in a wireless communication system that utilizes physical layer PHY data units that conform to a first format, where the first format is associated with a first number of symbols in a preamble, a method for processing a PHY data unit that conforms to a second format, where the second format is associated with a second number of symbols in the preamble, where the second number is smaller than the first number, where communication devices utilize PHY data units that conform to the first format and PHY data units that conform to the second format to communicate information associated with a layer of a protocol stack above a media access channel (MAC) layer, includes receiving an indication that the PHY data unit conforms to the second format; processing the PHY data unit that conforms to the second format in accordance with the second format; and utilizing PHY information elements in another portion of the PHY data unit that conforms to the second format to perform a PHY function.

In another embodiment, a communication device for use in a wireless communication system that utilizes physical layer (PHY) data units that conform to a first format associated with a first number of symbols in a preamble and a second format associated with a second number of symbols in the preamble, where the second number is smaller than the first number, where the communication device utilizes PHY data units that conform to the first format and PHY data units that conform to the second format to communicate information associated with a layer of a protocol stack above a media access channel (MAC) layer, includes a notification detector configured to process an indication that a PHY data unit conforms to the second format; and a PHY processor configured to process the PHY data unit according to the second format; where the communication device utilizes an information element in the PHY data unit to perform a communication function, where the information element is in a portion of the PHY data unit that follows a preamble of the PHY data unit.

BRIEF DESCRIPTION OF THE DRAWINGS

FIG. 12 is a diagram of a service period during which a station generates a data unit including a media access control (MAC) information element (IE) that specifies a number of short-preamble PHY data units the station intends to transmit in accordance with an embodiment of the present disclosure;

FIG. 13 is a diagram of a service period during which several stations generate data units with MAC IEs that specify respective numbers of short-preamble PHY data units the stations intend to transmit in accordance with an embodiment of the present disclosure;

FIG. 19 is a diagram of an acknowledgement frame including a frame control IE in which a field specifies whether a request to transmit short-preamble PHY data units has been granted, in accordance with an embodiment of the present disclosure;

FIG. 20 is a diagram of a frame control IE used in the acknowledgement frame of FIG. 19 according to another embodiment of the present disclosure;

DETAILED DESCRIPTION

Figure 1:
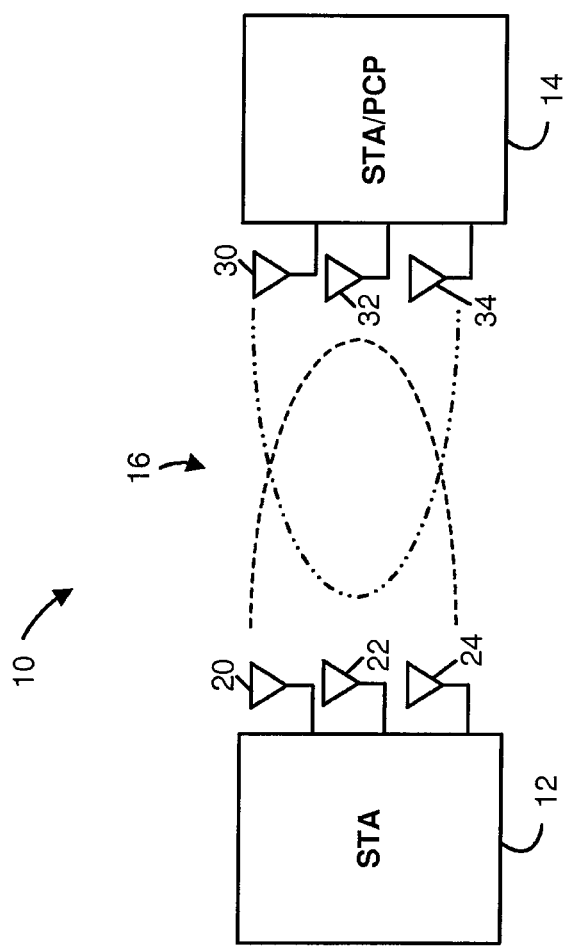
FIG. 1 is a block diagram of a communication system including a pair of devices that use physical layer (PHY) data units that conform to a PHY data unit format in accordance with one embodiment of the present disclosure.

FIG. 1 is a block diagram of an example wireless communication system 10 in which a pair of network devices, such as a station 12 and a station 14, transmit and receive data units (e.g., packets) via a shared wireless communication channel 16 according to a communication protocol that utilizes different physical (PHY) layer/media access control (MAC) layer packet formats depending on the mode of operation. In an embodiment, when the devices 12 and 14 need to exchange information provided in a layer in a protocol stack at or above the MAC layer, a first format type ("regular PHY") is utilized, whereas if a control procedure such as beamforming training is being performed, a second format type ("control PHY") is utilized. (In an embodiment, the control PHY format is also used, in some circumstances, when the devices 12 and 14 need to exchange information provided in a layer in a protocol stack at or above the MAC layer.) Further, the devices 12 and 14, in some embodiments, utilize different formats of the type regular PHY in view of the physical conditions of the communication system 10 and/or latency requirements of the stations 12 and 14. Thus, for example, when the stations 12 and 14 are relatively far from each other and/or when the stations 12 and 14 achieve only a "partial" (i.e., a sub-optimal) beamforming gain, a PHY format including a preamble of a regular length is utilized. On the other hand, when the stations 12 and 14 are separated by a short distance (e.g., less than one foot, an acceptable distance for a particular application), for example, or when the beamforming gain achieved by the stations 12 and 14 is "full" (i.e., optimal) or, at least, sufficiently high (e.g., exceeding a certain threshold), PHY data units are transmitted using a short preamble format to reduce PHY overhead and, accordingly, improve the efficiency of data transfer over the communication channel 16. In some embodiments, the control PHY format type also includes multiple subformats defined for separate procedures (e.g., beacon transmission, beamforming), different network types (e.g., SC only, OFDM only, SC/OFDM), and/or other purposes.

For clarity, regular PHY data units having a short preamble are referred to herein as "short-preamble regular PHY" data units or packets. Also, in the present disclosure, the terms "frames," "PHY data units," and "PHY packets" are used interchangeably to refer to a group of symbols beginning with a PHY preamble and including at least one other portion, such as a PHY header.

In one example scenario, the device 12 is a device such as a mobile phone, a digital camera, a printer, etc., and the device 14 is a device such as a a personal computer (PC). The devices 12 and 14 are equipped with respective sets of one or more antennas 20-24 and 30-34, and are used as a wireless replacement of a PCI bus or a USB bus, in this example scenario. It is beneficial for the devices 12 and 14 to be able to communicate with a low PHY overhead at least when the devices 12 and 14 are placed close to each other. In an embodiment, the device 14 operates as a piconet central point (PCP) with respect to the device 12 (although the device 14, at other times and/or with respect to other devices not shown in FIG. 1 can operate as a station, as opposed to a PCP). Although the example wireless communication system 10 illustrated in FIG. 1 includes two devices 12, 14, each with three antennas, the wireless communication system 10 in general can include any number of devices, each equipped with the same or a different number of antennas (e.g., 1, 2, 3, 4 antennas and so on). For beamforming, however, at least one of the devices 12, 14 generally should include more than one antenna.

In general, devices in the wireless communication system 10 operate in multiple modes (e.g., a transmit mode and a receive mode). Accordingly, in some embodiments, antennas 20-24 and 30-34 support both transmission and reception. Alternatively or additionally, a given device includes separate transmit antennas and separate receive antennas. It will be also understood that because each of the devices 12 and 14 has a single antenna or multiple antennas, depending on the particular implementation, the wireless communication system 10 can be a multiple input, multiple output (MIMO) system, a multiple input, single output (MISO) system, a single input, multiple output (SIMO) system, or a single input, single output (SISO) system.

Example techniques for generating PHY data units that conform to one of the short preamble formats of the present disclosure are discussed below. Additionally, example techniques for processing PHY data units having short preambles are discussed below. Also, example techniques for notifying peer stations and/or a PCP that one or more PHY data units having a short preamble will be or are being transmitted are discussed below. Further, example techniques for requesting that a PCP allocate a time period during which stations can exchange information using a short preamble format are discussed below. First, however, superframe and timeslot scheduling techniques are discussed with references to FIG. 2, and an example PHY data unit format is discussed with reference to FIG. 3.

Figure 2:
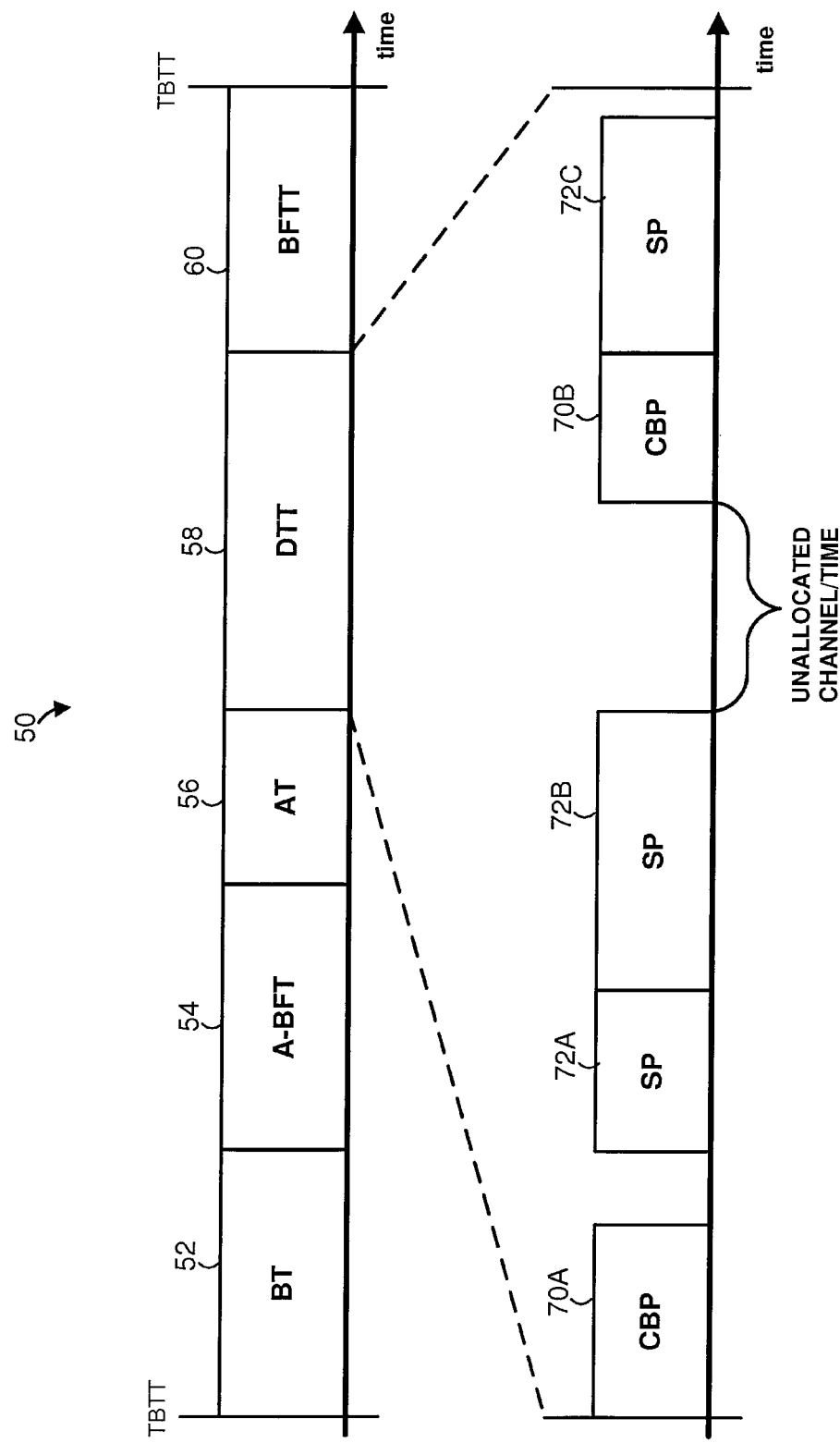
FIG. 2 is a diagram of a superframe format according to one embodiment of the present disclosure.

Referring to FIG. 2, a schedule according to which the network devices 12 and 14 communicate, in accordance with one embodiment, includes a superframe 50 having several timeslots serving different purposes. Timing of the superframe 50 in this embodiment is established by a PCP, for example, and is measured relative to a target beacon transmission time (TBTT). The superframe 50 includes a beacon time (BT) timeslot 52, an association beamforming training (A-BFT) timeslot 54, an announcement time (AT) timeslot 56, a data transmit time (DTT) timeslot 58, and a beamforming training time (BFTT) timeslot 60. It is noted that the timeslots within the superframe 50 are not drawn to scale, and that the duration of each of the timeslots 52-60 can be configurable and/or implementation-dependent. Further, although the superframe 50 is illustrated in FIG. 2 with specific types of timeslots in a specific order, in various embodiments one or more additional types of timeslots are included, one or more illustrated timeslots are omitted, and the order of timeslots is different during a given beacon interval.

In one implementation, the BT timeslot 52 is used by a PCP to transmit discovery beacons that conform to a control PHY format discussed with reference to FIG. 4. In addition to alerting stations proximate to the PCP of the presence of the PCP, data transmitted during the BT timeslot 52 is used for beamforming in some embodiments. More specifically, in these embodiments, a device applies a different beamforming matrix to its receive antenna set as each beacon is transmitted by the PCP during the BT timeslot 52. The device then measures the quality of each received beacon (e.g., a signal to noise ratio (SNR), a bit error rate (BER), etc.), and uses the measurements in determining a beamforming matrix that provides the best quality, for example, for receive beamforming. Because the information transmitted during the BT timeslot 52 is primarily for use by unassociated devices, the PCP transmits data during this interval typically at a low data rate.

In the example format of FIG. 2, the A-BFT timeslot 54 is allocated primarily so that new stations that are not yet beamformed can perform beamforming training with the PCP. For instance, if receive beamforming training was not completed by an unassociated station during the BT timeslot 52, the unassociated station receives additional beamforming training data during the A-BFT timeslot 54. Also, the unassociated station, in some scenarios, performs transmit beamforming training, and/or the PCP develops transmit and/or receive beamforming matrices with respect to the unassociated station. Similar to the BT timeslot 52, the A-BFT timeslot 54 typically does not include information or communication opportunities that associated and beamformed stations are intended to use. Stations and/or the PCP, in at least some of the embodiments, utilize a control PHY format to generate PHY data units that are transmitted during the BT timeslot 52 and the A-BFT timeslot 54.

In an embodiment, the AT timeslot 56 is used by a PCP to announce timeslot allocation and scheduling information, for example, to stations already associated with the network. For example, the PCP, in one embodiment, indicates the types and the corresponding start times of timeslots in the DTT interval 58. In some scenarios discussed below, a PCP designates one or several timeslots within the DTT interval 58, or service periods within such timeslots, to be used with short-preamble PHY data units. In general, the PCP exchanges management frames with one or several stations in the AT timeslot 56 related to scheduling of service periods, contention-based periods, BFT periods, etc., channel measurement, association information, and other data.

The DTT timeslot 58 is used to transmit data between the PCP and a communicating station, or between two or more communication stations. Further, in the example embodiment illustrated in FIG. 2, the DTT timeslot 58 is divided into multiple timeslots, and the PCP announces the scheduling and assignment of these timeslots (e.g., reserved for a station with identity I) during the AT timeslot 56.

In an embodiment, the DTT timeslot 58 includes contention-based periods (CBP) 70A-B and several service periods (SPs) 72A-C. In general, a service period is allocated by the PCP for a particular function, such as for two stations to communicate with each other. The contention periods 70A-B define time resources that communicating devices can dynamically acquire in real time (as opposed to asking the PCP to allocate time to the device and waiting to be informed by the PCP of an allocated time period, for example).

The BFTT timeslot 60 is used to perform beamforming training between the PCP and one or several associated stations, or between several associated stations that discover each other via a series of request and response frames.

In an embodiment, the PCP schedules the SP 72A-C to begin at desired points within the DTT timeslot 58, and the PCP uses information elements used for SP identification to specify the use and timing of the SPs 72A-C. In an embodiment, devices transmit regular length preamble and/or short-preamble PHY data units during CBP timeslots 70A-B and/or SPs 72A-C. In an embodiment, when a short-preamble PHY data unit is being or will be transmitted, the transmitting device signals to the receiving device that the short-preamble PHY data unit is being and/or will be transmitted. As discussed above, in an embodiment, the PCP allocates an SP in which short-preamble PHY data units are to be transmitted by the devices for which the SP has been allocated.

Figure 3:
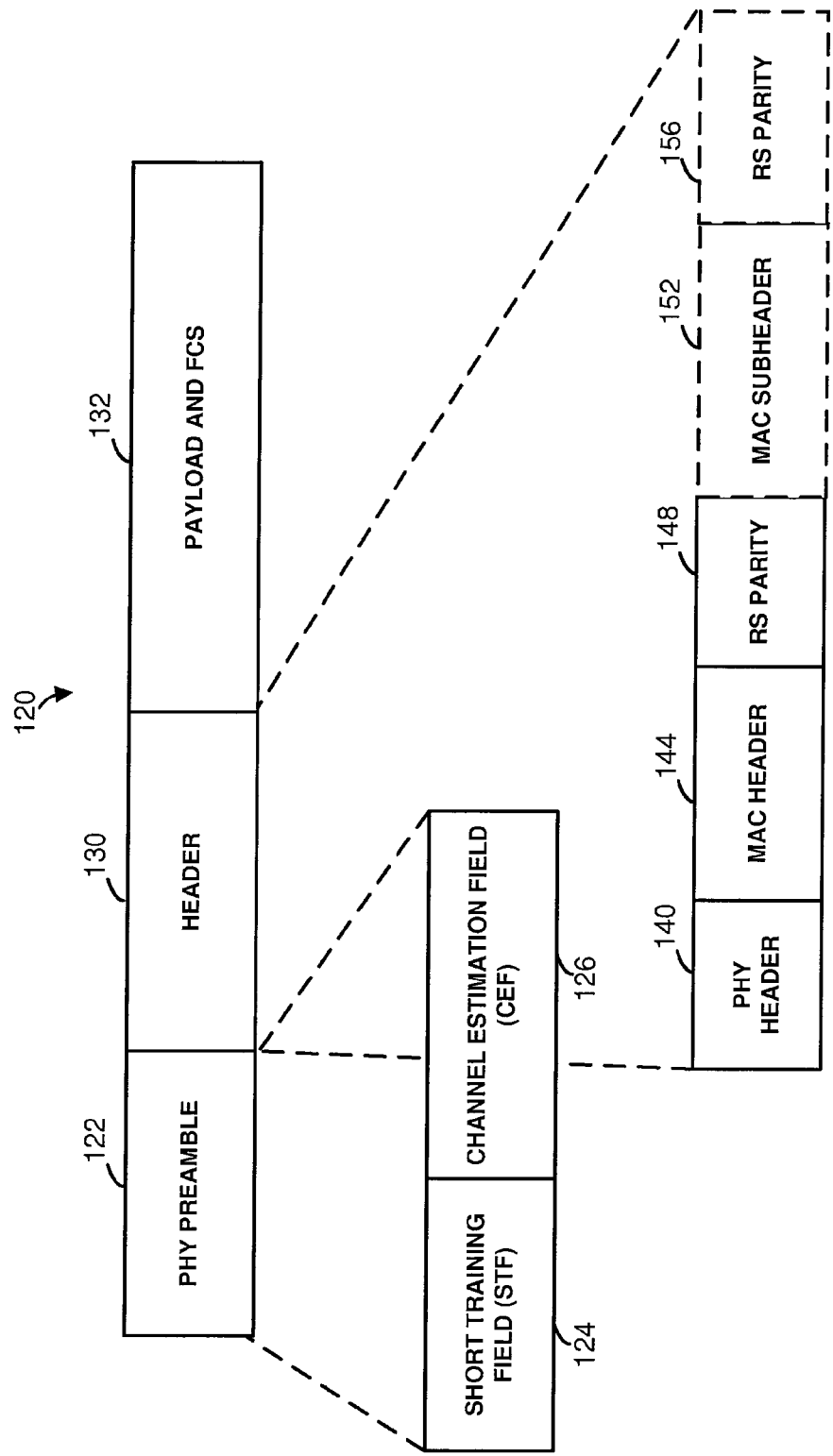
FIG. 3 is a diagram of a PHY data unit format according to one embodiment of the present disclosure.

FIG. 3 is a diagram of an example PHY packet format 120 that includes a preamble 122 and another portion that includes a header 130, and a payload 132. According to the IEEE 802.15.3c Draft D0.0 Standard, for example, the preamble 122 generally provides training information that helps the receiver 14 detect the packet 120, adjust an automatic gain control (AGC) setting, obtain frequency and timing synchronization, etc. Also according to the IEEE 802.15.3c Draft D0.0 Standard, the header 130 provides information of basic PHY parameters for decoding the payload (e.g. a length of the payload, modulation/coding method, pilot insertion information, cyclic prefix length in OFDM mode, preamble length of the next packet, reserved fields, etc.) so that a network device 12 or 14 (see FIG. 1) that receives the packet 120 can adjust its decoding apparatus accordingly. The header 130 also includes MAC layer information.

FIG. 3 also illustrates a format of the header 130 specified in the IEEE 802.15.3c Draft D0.0 Standard. The header 130 includes a PHY header 140, a MAC header 144 (including a header check sequence (HCS)), and Reed-Solomon parity bits 148 generated from the MAC header 144. According to the IEEE 802.15.3c Draft D0.0 Standard, the header 130 optionally includes a MAC sub-header 152 (including an HCS) and Reed-Solomon parity bits 156 generated from the MAC sub-header 152.

With continued reference to FIG. 3, the preamble 122, in an embodiment, includes a short training field (STF) 124 and a channel estimation field (CEF) 126. The STF 124 generally includes information that is useful for synchronization, whereas the CEF 126 generally includes information that is useful for channel estimation. For example, in an embodiment, the STF 124 includes a synchronization (sync) sequence, and the CEF includes a channel estimation sequence (CES).

Figure 4:
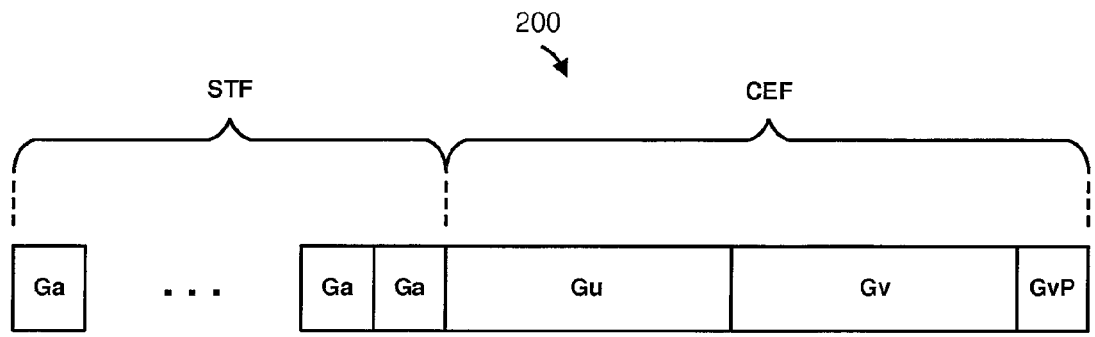
FIG. 4 is a diagram of a preamble of a control PHY data unit in an embodiment of the present disclosure.
Figure 5:
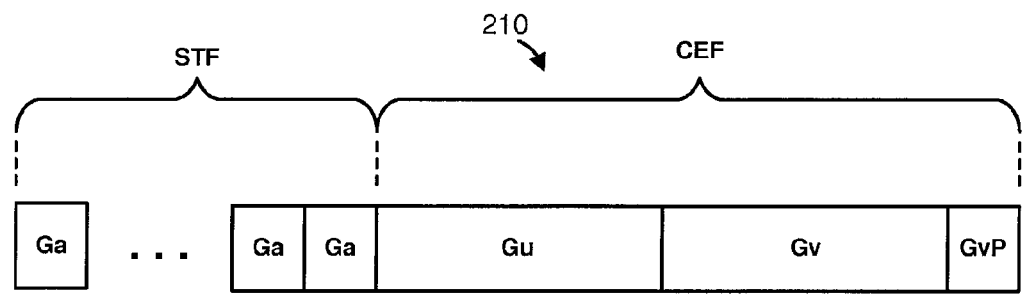
FIG. 5 is a diagram of a preamble of a regular PHY data unit in an embodiment of the present disclosure.

Next, FIGS. 4-9 illustrate several formats of PHY data units that the network devices 12 and 14 of FIG. 1, as well as other devices operating in the communication system 10 (including a PCP, for example), utilize in embodiments according to the present disclosure. It is noted that, in some embodiments of the communication network 10, a control PHY preamble is not used at all, and network devices format all PHY data units using a regular PHY preamble or a short regular PHY preamble. For example, to communicate beam-forming data in these embodiments, a network device utilizes a regular PHY preamble. However, for clarity of explanation, FIG. 4 illustrates a control PHY preamble format, FIG. 5 illustrates a regular PHY preamble format, and FIGS. 6-9 illustrate several example formats of a short-preamble regular PHY. In some embodiments, the preambles have the same general format in control PHY packets and regular PHY packets, except that the length of the STF field is modified according to each format. In other embodiments, the preambles have the same general format except for the length of the CEF field. In yet other embodiments, the preambles differ in several parameters, as discussed below.

FIG. 4 is a diagram of an example preamble 200 in a control PHY packet. The preamble includes an STF made up of a plurality of Golay sequences Ga. As is known, the sum of out-of-phase aperiodic autocorrelation coefficients of the Golay sequence Ga and a corresponding complementary Golay sequence Gb is zero. In another aspect, the complementary Golay sequences Ga and Gb have aperiodic cross-correlation with a narrow main lobe and low-level side lobes. Accordingly, the Golay sequence Ga is suitable for detection at a receiving device. In an embodiment, the sequence Ga is a length-128 sequence. In other embodiments, however, the sequence Ga is of some other suitable length. Further, spreading sequences other than Golay sequences (preferably having correlation properties suitable for detection at a receiving device) can be used in other embodiments of the preamble 200.

A CEF of the preamble 200 includes channel estimation symbols (CES) Gu and Gv, followed by a cyclic postfix of Gv, GvP. In an embodiment, each of the CES symbols Gu and Gv is composed of a certain pattern of the sequences Ga and Gb modified by a cover code. As used herein, the term "cover code" refers to how a series of sequences are augmented to form a longer sequence. For example, for a sequence [−b, +a, +b, +a], where a and b are complementary sequences, the cover code can be represented as [−1, +1, +1, +1], where −1 indicates that the binary complement of the code a or b is utilized, or that the modulated signal corresponding to code −a, for example, is phase shifted by 180° with respect to the modulated signal corresponding to code +a. In this example [−b, +a, +b, +a], the cover code could be represented differently, such as [0, 1, 1, 1], where the first 0 indicates that −b is utilized.

In an embodiment, several Ga and Gb sequences in the CEF of the preamble 200 form composite sequences Gu and Gv, where Gu and Gv are themselves complementary sequences. If the sequences Ga and Gb are each of length 128, then the sequences Gu and Gv are each of length 512, in an embodiment. The sequence GvP, in an embodiment, is merely the sequence −Gb, and the sequence GvP acts as a cyclic postfix of the sequence Gv.

To enable network devices that have not yet beamformed, or network devices that communicate over large distances over a wireless channel associated with a low SNR, to transmit and receive at least some PHY packets, the preamble 200 includes a relatively high number of iterations of the sequence Ga in the STF. In an embodiment, the sequence Ga repeats 50 times in the STF of the preamble 200. Further, in some embodiments, the CEF of the preamble 200 is also relatively long to provide more reliable frame timing, i.e., the CEF includes a greater number of symbol (e.g., chips into which information bits are spread) than a regular PHY preamble discussed below. As also indicated above, the communication system 10 of FIG. 1 supports SC-only, OFDM-only, or dual-mode (SC and OFDM) network devices. Accordingly, to enable any device operating in the communication system 10 to transmit and receive at least control PHY packets, modulation of a control PHY packet, including the preamble 200, is preferably selected to match the slowest data rate supported in the communication system 10. In an embodiment, modulation of the control PHY packet corresponds to SC modulation.

Referring to FIG. 5, an example preamble 210 of a regular PHY packet is generally similar to the preamble 200 illustrated in FIG. 4, except that the preamble 210 includes a smaller number of iterations of the sequence Ga in the STF. In the embodiment referenced above, the STF of the preamble 200 includes 50 iterations of the sequence Ga, whereas the STF of the preamble 210 includes 15 iterations of the same sequence Ga. In the embodiment of FIG. 5, the preambles 200 and 210 include identical CEF fields.

Figure 6:
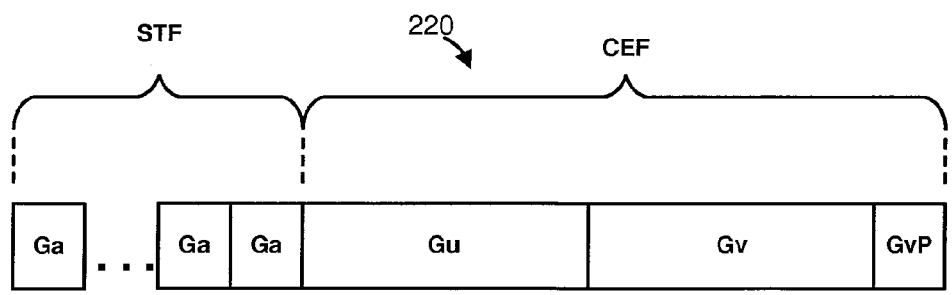
FIGS. 6-9 are diagrams of a short preamble of a regular PHY data unit in various embodiments of the present disclosure.

Referring now to FIG. 6, an example preamble 220 of a short-preamble regular PHY packet is similar to the preamble 210 of a regular PHY packet. The STF of the preamble 220 includes several iterations of the sequence Ga. However, the STF of the preamble 220 is shorter (e.g., includes fewer symbols) than the STF of the preamble 210. The number of iterations of the sequence Ga in one embodiment is 5, for example. Further, in those embodiments where control PHY packets are used, the STF of the preamble 220 is shorter than the STF of the preamble 210 as well as the STF of the control PHY preamble (e.g., the control PHY preamble 200). In some embodiments of the communication system 10, network devices apply the preamble 210 (see FIG. 5) to regular PHY packets, and apply the preamble 220 to short-preamble regular PHY packets.

Thus, in the examples discussed above, the preambles 210 and 220 are similar except for the length of the STF. In an embodiment, a receiving station will apply a different synchronization technique when receiving the preamble 220 as compared to when receiving the preamble 210. In this embodiment, the receiver, therefore, should be signalled that it will receive or is receiving a short-preamble regular PHY packet. Example signaling or notification techniques are discussed below with reference to FIGS. 10-21. For example, in one embodiment, a short-preamble regular PHY preamble includes an indication that identifies the preamble as a short preamble.

Figure 7:
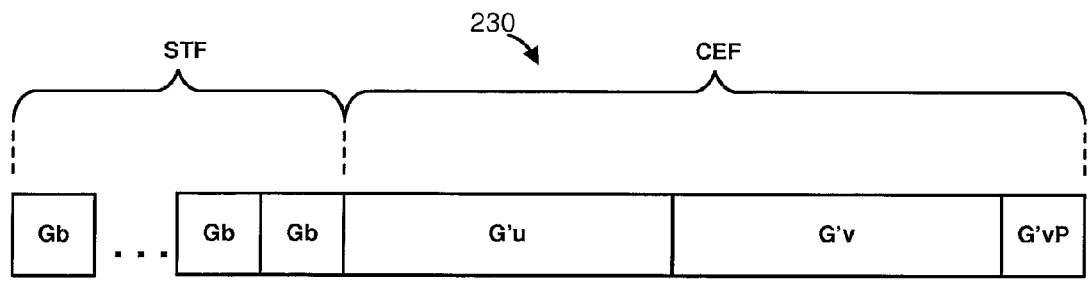

FIG. 7 is a diagram of a preamble 230 of an example short-preamble regular PHY that is used in conjunction with the regular PHY preamble 210 of FIG. 5, in an embodiment. In the preamble 230, the STF includes several iterations of the spreading sequence Gb, which, as mentioned above, is the complementary sequence of the sequence Ga used in the regular PHY preamble 210 of FIG. 5. In some embodiments of the communication system 10, network devices apply the preamble 210 (see FIG. 5) to regular PHY packets, and apply the preamble 230 to short-preamble regular PHY packets. The number of iterations of the sequence Gb in the preamble 230 is significantly lower than the number of iterations of the sequence Ga in the preamble 210. In an embodiment, the number of iterations of the sequence Gb is 5, and the number of iterations of the spreading sequence Ga in the preamble 210 is 15. By detecting a correlation with the sequence Gb, rather than Ga, in the STF of a preamble currently being received, the receiving network device (e.g., a station, a PCP) determines that the preamble being received corresponds to a short-preamble regular PHY packet and thus includes fewer symbols than the preamble 210 of the regular PHY packet. Conversely, if the receiving network device detects a correlation with the sequence Ga, the receiving station determines that the preamble being received corresponds to a regular PHY packet and thus the preamble includes a greater number of symbols.

It is noted that in other embodiments, complementary sequences in the STF are used to prospectively notify a receiving device that the transmitting device intends to transmit one or more short-preamble PHY packets in the current service period or some other time period. For example, in an embodiment, a transmitting device generates the preamble of a regular PHY packet using a certain number of iterations of the sequence Ga in the STF when the regular PHY packet does not include a prospective notification, or using the same number of iterations of the sequence Gb in the STF to indicate that the transmitting device intends to use short-preamble regular PHY packets (having the preamble 220, for example) in the remaining portion of the current service period.

Figure 8:
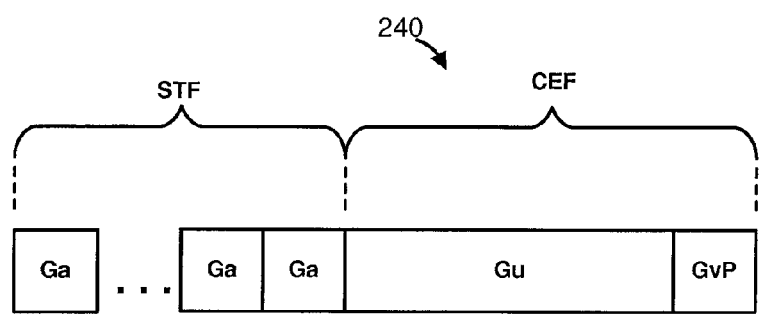
Figure 9:
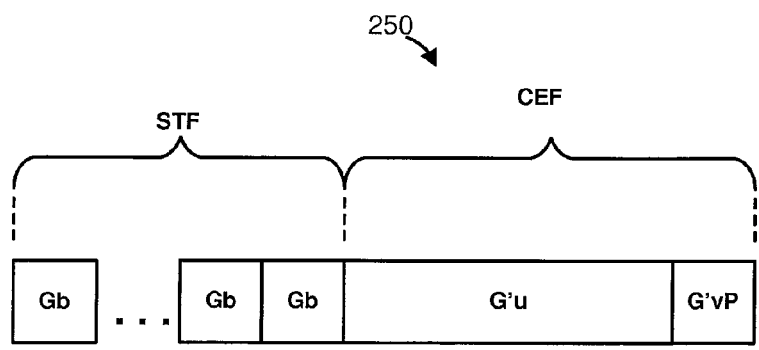

Referring to FIG. 8, an example preamble 240 of a short-preamble regular PHY packet includes a CEF that is shorter than the CEF of the preamble 210. The STF of the preamble 240 is also shorter than the STF of the preamble 210. In an embodiment, the preamble 240 includes five iterations of the sequence Ga, and the preamble 210 includes 15 iterations of the sequence Ga. In the embodiment of FIG. 8, the CEF of the preamble 240 includes only one CES symbol, Gu. In other words, the CEF of the preamble 240 does not include the CES symbol Gv, which is included in the CEF of the preamble 210. In other embodiments, a CES symbol other than Gu is used in the CEF of the preamble 240. Thus, an example preamble 250 illustrated in FIG. 9 includes a CEF in which the CES symbol G'u is complementary to the sequence Gu used in the preamble 210. The STF of the preamble 250 includes the same number of sequences as the STF of the preamble 240 (which is smaller than the number of sequences in the STF of the preamble 210), but the STF of the preamble 210 is spread using the sequence Gb so that the last portion of the STF serves as a cyclic prefix of the sequence Gu. In yet other embodiments, the symbol G'u is neither identical nor complementary to Gu used in the preamble 210. Rather, the sequence G'u is unrelated to the sequence Gu (and to the sequence Gv, in an embodiment).

Further, some embodiments of a short PHY preamble include a shorter CEF as compared to the preamble 210 but the same STF as the preamble 210. For example, in an embodiment, a short PHY preamble has the same general format as the preamble 240 of FIG. 8, but having the same number of sequences Ga as the preamble 210.

Further regarding FIGS. 4-9, different formats of PHY data units can be defined using any suitable techniques such as using different spreading sequences in the STF, using different cover codes in the STF, using different CES symbols in the CEF, using different spreading sequences and/or cover codes in the SFD, etc. Moreover, network devices can signal formats using spreading codes, cover codes, etc. in one or several portions of the preamble. Example techniques for formatting a preamble of a PHY data unit and signaling formatting types using spreading sequences, cover codes, etc. are described in commonly-owned, co-pending U.S. patent application Ser. No. 12/466,984, filed on May 15, 2009, and entitled "Efficient Physical Layer Preamble Format," and Ser. No. 12/569,547, filed on Sep. 29, 2009, and entitled "Physical Layer Data Unit Format," both of which are hereby expressly incorporated by reference herein.

Figure 10:
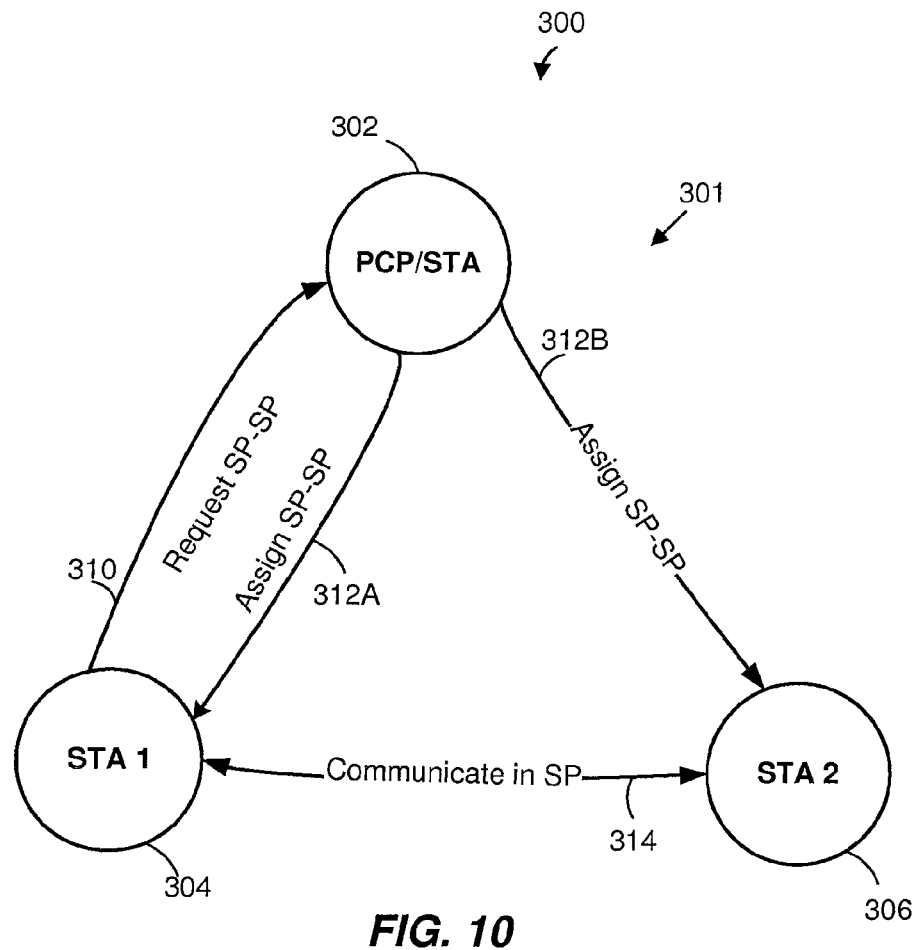
FIG. 10 is a diagram of a network in which a piconet central point (PCP) allocates a short preamble service period (SP-SP) in response to a request from a station according to one embodiment of the present disclosure.
Figure 11:
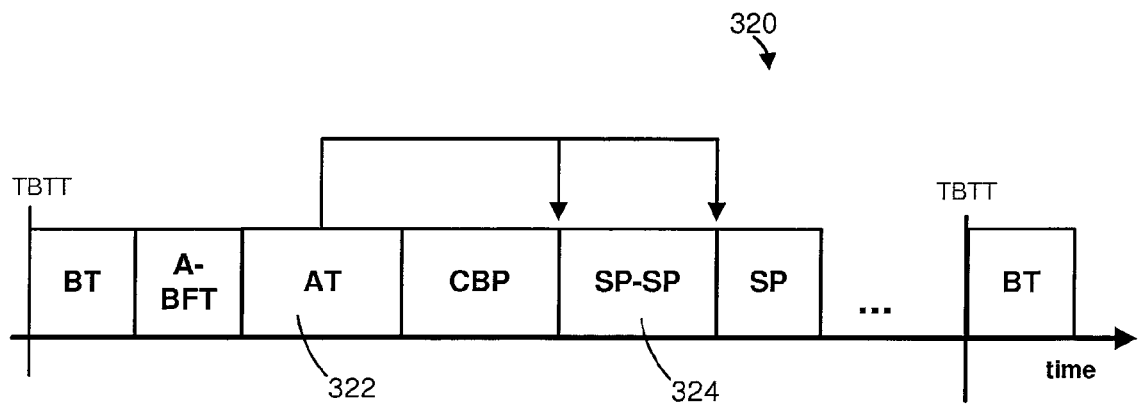
FIG. 11 is a diagram of a beacon interval in which an announcement in an allotment time (AT) timeslot specifies the timing of an SP-SP in accordance with an embodiment of the present disclosure.
Figure 14:
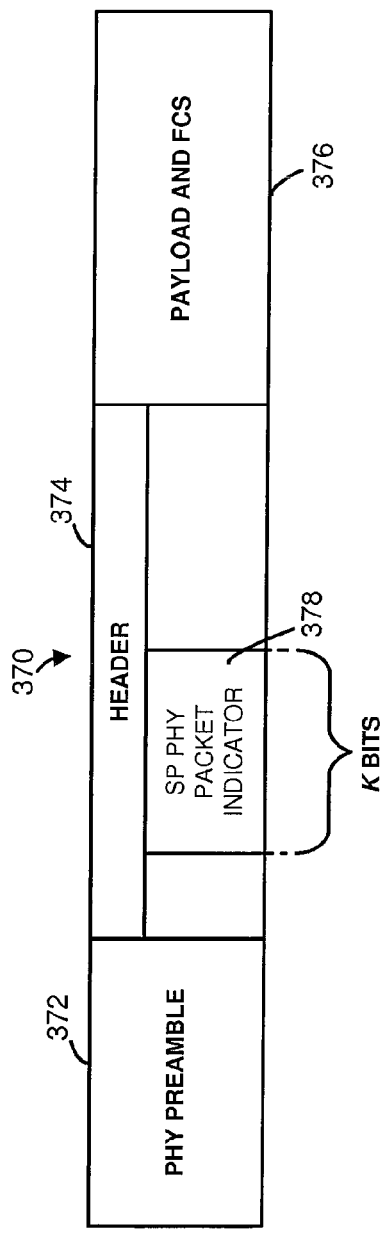
FIG. 14 is a diagram of a PHY data unit that includes an IE in the PHY header that specifies a number of short-preamble PHY data units the station proposes to transmit according to one embodiment of the present disclosure.

As indicated above, in some embodiments a receiving network device is notified that a shorter-preamble PHY packet will be transmitted prior to receiving the shorter-preamble PHY packet. Several example notification techniques are discussed next with reference to FIGS. 10-21. In particular, FIGS. 10 and 11 illustrate an example technique for scheduling a dedicated service period in which network devices communicate using short-preamble PHY packets; FIGS. 12 and 13 illustrate an example technique for negotiating short-preamble PHY packets within a "general purpose" service period; FIG. 14 illustrates an embodiment in which the PHY header of a packet is modified to include a prospective notification regarding short-preamble PHY packets; and FIGS. 15-21 illustrate several example techniques for signaling an intent to transmit one or several short-preamble PHY packets via the MAC layer of a communication protocol stack.

Referring to FIG. 10, an embodiment of a communication system 300 includes a piconet 301. The piconet 301 includes a device 302 that acts as a piconet central point (PCP). In the example scenario illustrated in FIG. 10, stations 304 and 306 are already associated or beamformed with the piconet 301. The PCP 302 communicates with various devices such as the stations 304 and 306 in timeslots scheduled in a superframe that is the same as or similar to the superframe 50 illustrated in FIG. 2, according to an embodiment.

When the station 304 determines that short-preamble PHY packets can be exchanged in one or both directions between the stations 304 and 306 (e.g., based on an SNR measurement, a bit error rate (BER), a packet error rate (PER), a beamforming gain measurement that exceeds a certain threshold, a distance measurement, a user command), the station 304 transmits a short-preamble service period (SP-SP) request 310 to the piconet 302. In an embodiment, the SP-SP request 310 is transmitted during the AT period (see FIG. 2). The PCP 302 allocates an SP-SP, if available, and transmits an SP-SP assignment 312A to the station 304 and a similar SP-SP assignment 312B to the station 306 within the AT period. The SP-SP assignments 312A and 312B in general need not be dedicated messages. Rather, the SP-SP assignments 312A and 312 can be included in a schedule announcement (or separate schedule announcements) the PCP 302 transmits in one or several AT periods. The stations 304 and 306 then exchange messages 314 within the assigned SP-SP using short-preamble PHY packets.

For explanatory purposes, FIG. 11 illustrates an example superframe 320 in which a PCP (such as the PCP 302) allocates, during an AT timeslot 322, an SP-SP 324. In this embodiment, a schedule announcement is transmitted by the PCP 302 in the AT 322, which schedule announcement specifies a start time and an end time or an indication of the duration of the SP-SP 324. In another embodiment, the schedule announcement specifies only a start time of an SP-SP, and the duration of the SP-SP is defined by the communication protocol.

FIG. 12 is an example service period 340 that has been allocated by a PCP to stations 342 and 346 for a peer-to-peer exchange of information. In this embodiment, the service period is not an SP-SP, but a "regular" service period. As illustrated in FIG. 12, station 342 generates and transmits a regular PHY packet 344 to a station 346. The regular PHY packet 344 includes a short preamble PHY request, e.g., an indication that the station 342 intends to transmit N short-preamble regular PHY packets to the station 344, where N is a positive integer. In an embodiment, the preamble of the packet 344 conforms to the format illustrated in FIG. 5, for example, or to any other suitable format associated with regular PHY packets, i.e., packets used to communicate information at or above the MAC layer. Further, in those communication systems that use a shared preamble format in control PHY (e.g., beacon, beamforming) packets and regular PHY packets, the packet 344 conforms to this shared preamble format.

If the station 346 is capable of processing short-preamble regular PHY packets, the station 346 transmits a regular PHY packet 348 that includes a positive acknowledgement corresponding to the short preamble PHY request. The preamble of the packet 348 in this embodiment also conforms to the format illustrated in FIG. 5, according to an embodiment, or to any suitable format. In other scenarios, the station 346 could transmit a negative acknowledgement (i.e., a rejection) to the station 344 or, as another alternative, not respond to the packet 344. In such scenarios, the station 342 chooses not to send short preamble PHY packets to the station 346, in an embodiment. On the other hand, upon receiving the packet 348 that indicates that the station 346 acknowledged the request in the packet 344, the station 342 transmits N short-preamble regular PHY packets 349 to station 1, as illustrated in FIG. 12. The preambles of packets 349 conform to one of the formats illustrated in FIGS. 6-9, for example, or to another suitable format.

In another embodiment, the station that receives a short preamble PHY request transmits an acknowledgement packet that itself includes a similar request to transmit short-preamble regular PHY packets. Referring to FIG. 13, in an example service period 350, a station 352 generates and transmits a short preamble PHY request in a regular PHY packet 354 similar to the packet 344 discussed above. A station 356 responds to the short preamble PHY request in a regular PHY packet 358 similar to the packet 348, except that the packet 358 additionally includes a short preamble PHY request from the station 356. In this example, the station 356 indicates that M short-preamble regular PHY packets will be transmitted to the station 352, if permitted.

With continued reference to FIG. 13, the station 352 acknowledges the short preamble PHY request from the station 356 in a regular PHY packet 360. The regular PHY packet in this embodiment is similar to the packet 348 illustrated in FIG. 12. Following the bidirectional exchange of short preamble PHY requests and respective acknowledgements, the station 352 transmits N short-preamble regular PHY packets 362 to the station 356, and the station 356 transmits M short-preamble regular PHY packets 364 to the station 352. Similar to the scenario discussed with reference to FIG. 12, the packets 354, 358, and 360 can include preambles that conform to the format illustrated in FIG. 5, or any other suitable format, while the packets 362 and 364 can conform to one of the formats illustrated in FIGS. 6-10, or any other suitable format.

Generally speaking, network devices such as the stations 342, 346, 352, and 356 can include short preamble PHY requests and corresponding responses in the PHY preamble, PHY header, MAC header, or an information element in a layer above the MAC layer.

FIG. 14 illustrates an example communication frame (or packet) 370 that includes a PHY preamble 372, a PHY header 374, and a payload along with a frame check sequence (FCS) 376. A short-preamble regular PHY notification field 378 is included in a predetermined location within the PHY header 374. In other words, the communication protocol in the embodiment specifies an information element within the PHY header 374 that indicates the number of short-preamble regular PHY packets to follow the frame 370. The notification field 378 in this example includes K bits to specify up to $2^K-1$ short-preamble regular PHY packets. In other embodiments, the notification filed 378 can be a single-bit field that indicates whether the remaining portion of the current service period will be used for short-preamble regular PHY packets.

Figure 15:
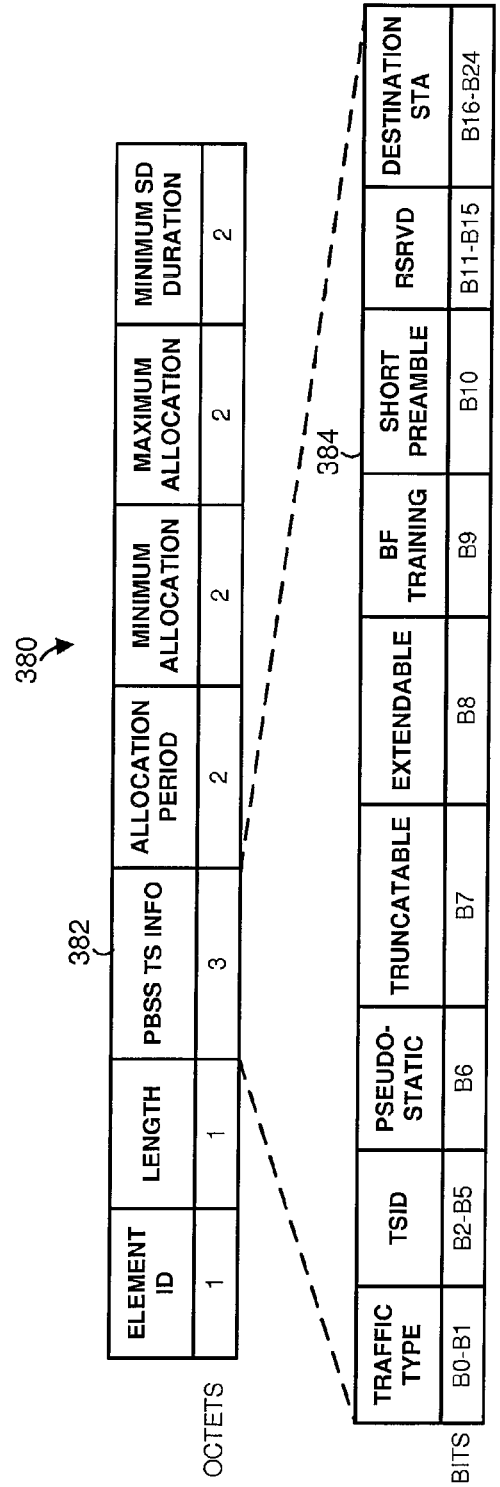
FIG. 15 is a diagram of a piconet basic service set (PBSS) transmission specification (TSPEC) IE including a field used to indicate that a station intends to use short-preamble PHY data units within one or several time periods according to an embodiment of the present disclosure.

On the other hand, FIG. 15 illustrates a MAC-layer information element (IE), a piconet basic service set (PBSS) transmission specification (TSPEC) 380 in which a PBSS timeslot (TS) information field 382 includes a one-bit field 384 that specifies whether the transmitting network device wishes to apply a short preamble format to regular PHY data units in a dedicated service period or in the remainder of the current service period, for example. Network devices can include the PBSS TSPEC IE 380 in add traffic stream (ADDTS) request frames, ADDTS response frames, delete traffic stream (DELTS) request frames, DELTS response frames, and other frames utilized in managing traffic streams to satisfy quality-of-services (QoS) parameters. In an embodiment, a station generates an ADDTS request frame in which a PBSS TSPEC IE, formatted in accordance with the PBSS TSPEC IE 380, corresponds to a time period which the station requests from a PCP for station-to-station or station-to-PCP communications. To indicate that the station intends to use short-preamble regular PHY data units in the requested period, the station utilizes the field 384, i.e., sets the field 384 to an appropriate value. In this manner, the station requests an SP-SP in this embodiment.

Figure 16:
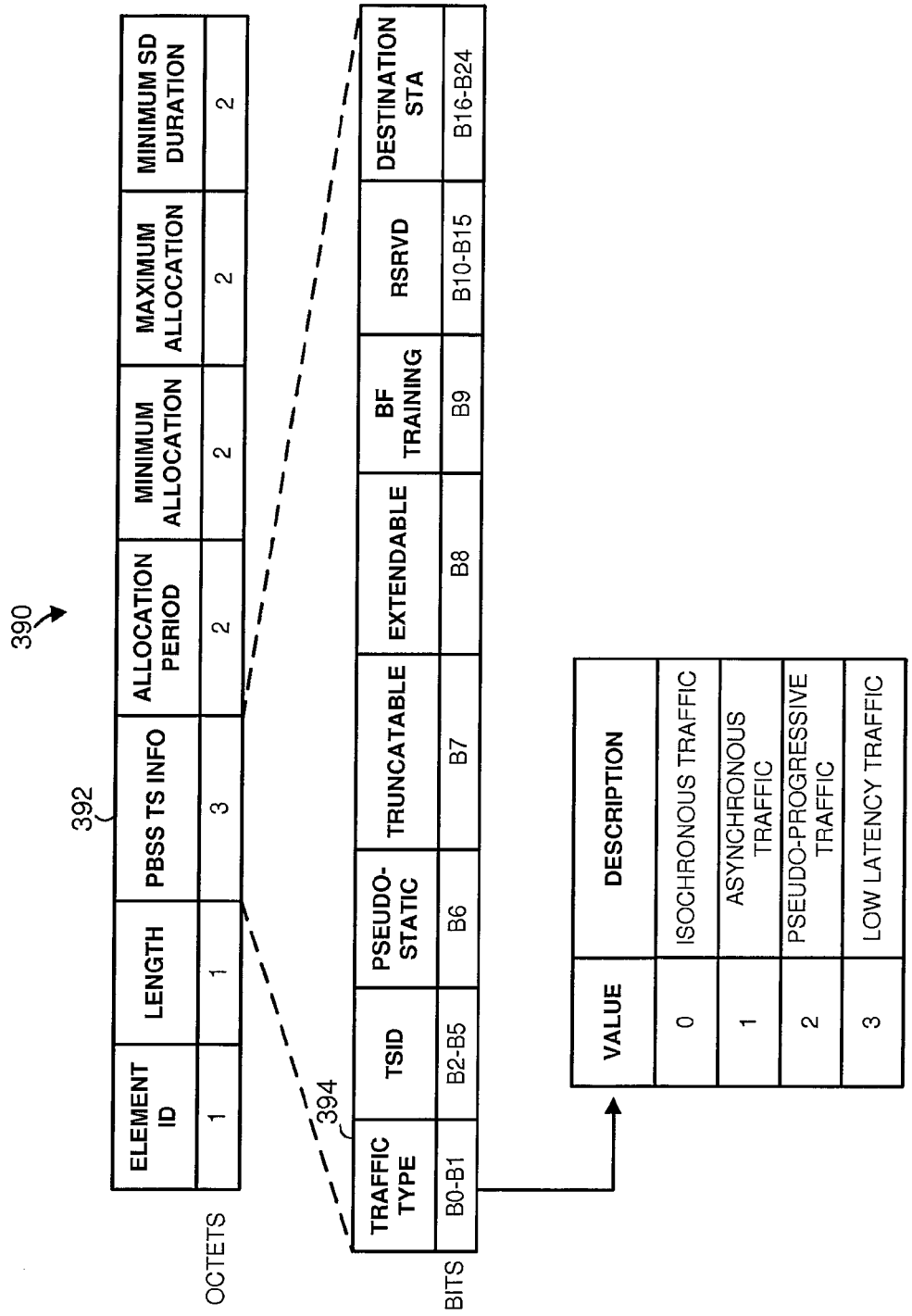
FIG. 16 is a diagram of a PBSS IE including a field used to indicate that the station intends to use short-preamble PHY data units within one or several time periods according to another embodiment of the present disclosure.

FIG. 16 illustrates another embodiment of a PBSS TSPEC IE 390. The PBSS TS information field 392 includes a traffic type descriptor 394 that specifies several types of traffic. The low-latency traffic type (corresponding to value 3) in this embodiment is used to request an SP-SP or a portion of the current service period for use with short-preamble regular PHY packets. In an embodiment, a station generates an ADDTS request frame in which a PBSS TSPEC IE, formatted in accordance with the PBSS TSPEC IE 390, corresponds to a time period the station requests from a PCP for station-to-station or station-to-PCP communications. To indicate that the station intends to use short-preamble regular PHY data units in the requested period, the station sets the value of the traffic type descriptor 394 to 3 (low-latency traffic).

Figure 17:
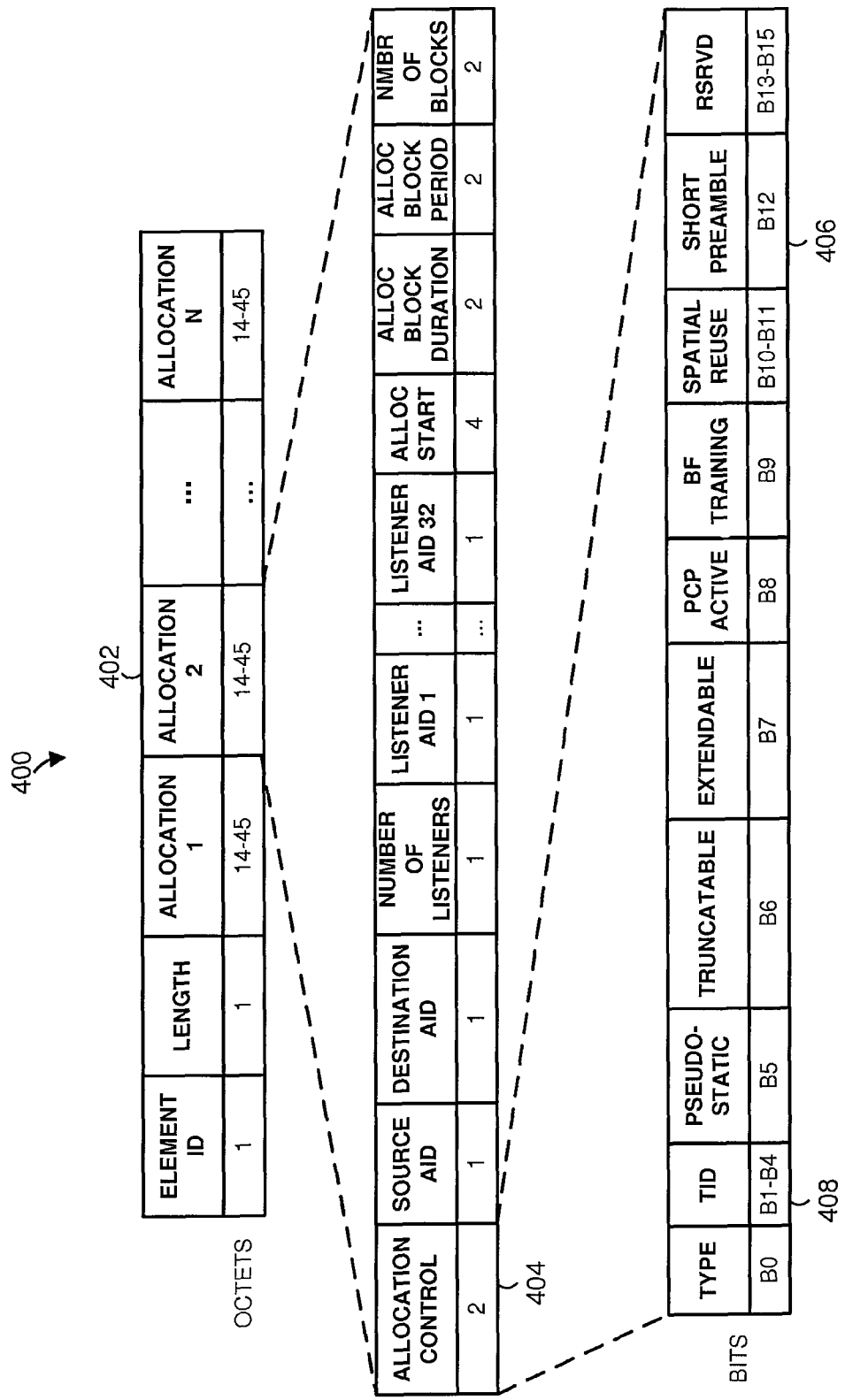
FIG. 17 is a diagram of a PBSS schedule IE including a field used to indicate to a station that an SP service period has been allocated in accordance with an embodiment of the present disclosure.

Next, FIG. 17 illustrates a PBSS schedule element 400 that a PCP transmits to stations during an AT period to specify, along with other parameters, whether a certain service period is being designated as an SP-SP, according to an embodiment. In particular, the PBSS schedule element 400 includes an allocation IE for each service period being scheduled, including, in this example, an allocation IE 402 that corresponds to an SP-SP. The allocation IE 402 includes an allocation control field 404 in which a short preamble field 406 identifies the service period as an SP-SP. In another embodiment, the PCP uses a traffic identity (TID) field 408 to identify the SP-SP (e.g., if a certain value of the TID field 408 is associated with short-preamble regular PHY packets).

Figure 18:
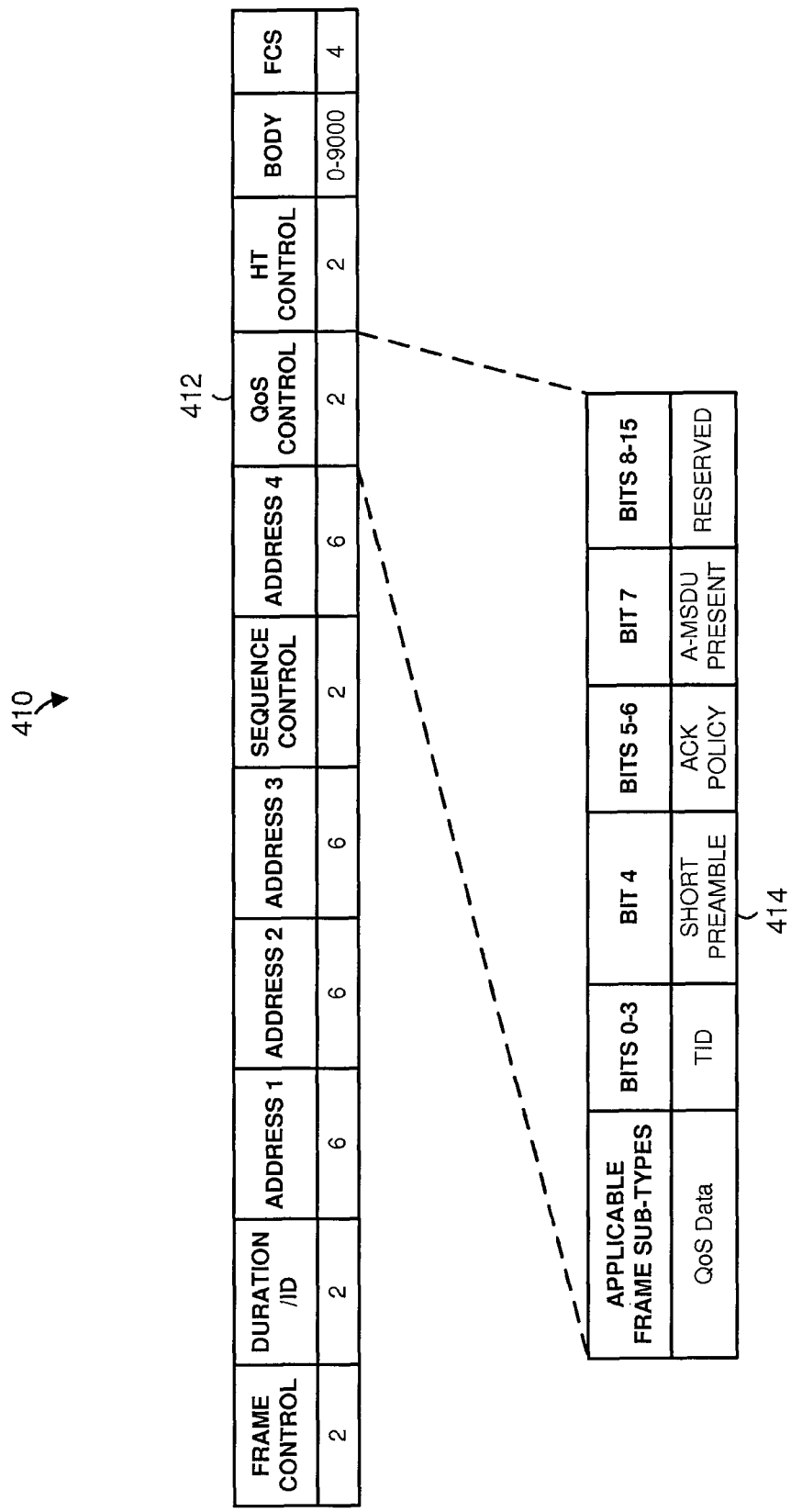
FIG. 18 is a diagram of a data frame including a Quality-of-Service (QoS) control IE in which a field specifies whether a station intends to transmit short-preamble PHY data units in accordance with an embodiment of the present disclosure.

Referring to FIG. 18, a data frame 410 (i.e., a frame used to communicate higher-layer data) in some embodiments also includes a short preamble field 414 in a QoS control element 412 to indicate that the device intends to format subsequent data frames in the service period as short-preamble regular PHY frames. Referring back to FIGS. 12 and 13, for example, the stations 342, 346, 352, and 356 can use the data frame 410 to convey short preamble PHY requests.

According to an embodiment, a receiving device acknowledges the data frame 410 using an acknowledgement frame 420 illustrated in FIG. 19. The acknowledgement frame 420 includes a frame control field 422 with a short preamble field 424. In an embodiment, a first value (e.g., a one) in the short preamble field 424 indicates that the receiving device will accept one or several short-preamble regular PHY packets, and a second value (e.g., a zero) indicates that the receiving device will not accept short-preamble regular PHY packets. In another embodiment, a frame control field 426 (FIG. 20), that is generally similar to the frame control field 422 (FIG. 19), additionally includes a reverse short preamble field 428 to specify whether the receiving device similarly intends to use short-preamble regular PHY packets when communicating data to the transmitting device.

Figure 21:
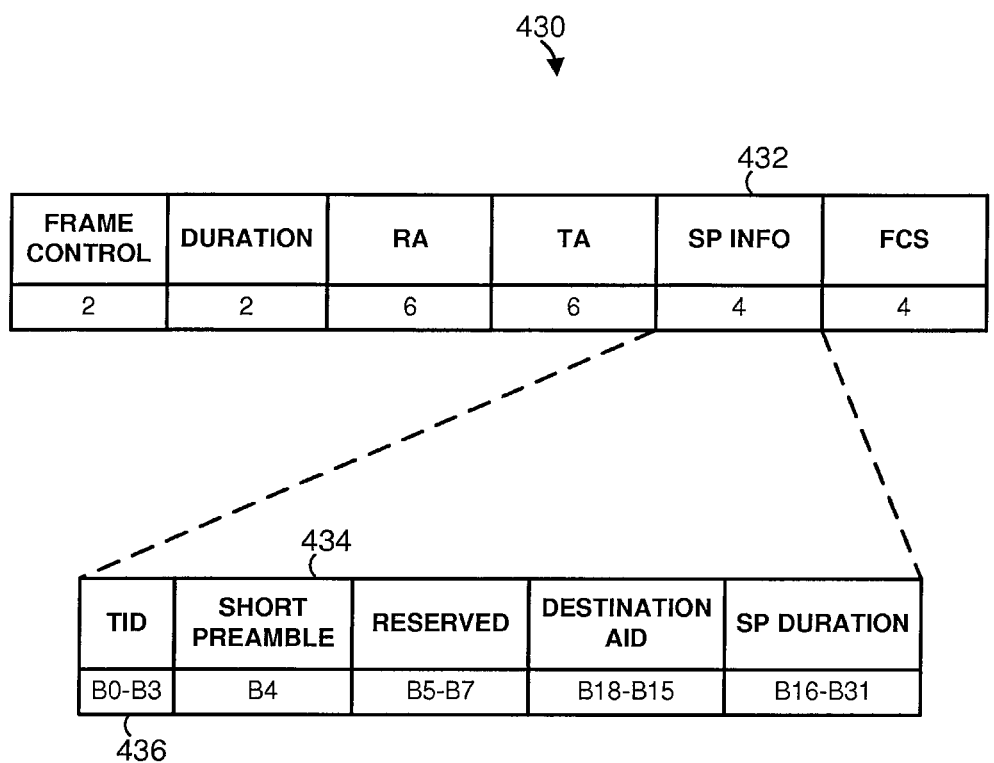
FIG. 21 is a diagram of a frame including a service period information IE in which a field specifies whether a station requests a service period during which short-preamble PHY data units are transmitted, to be used in dynamic channel allocation in accordance with an embodiment of the present disclosure.

Referring to FIG. 21, a station transmits a frame 430 in a polling period as a request frame, and/or a PCP transmits the frame 430 during a grant period as a grant frame during a dynamic channel time allocation in accordance with an embodiment. The frame 430 includes a service period information element 432 that in turn includes a short preamble field 434. In an embodiment, when a station intends to use short-preamble regular PHY packets in a service period being requested from a PCP in a request frame, the station sets the short preamble field 434 to a first value (e.g., one). Otherwise, the station sets the short preamble field 434 to a second value (e.g., zero). The PCP then generates a grant frame that conforms to the format of FIG. 21, in an embodiment, and sets the short preamble field 434 to the first value (e.g., one) to indicate that the request has been granted, or to the second value (e.g., zero) otherwise. It is noted that as in the examples discussed above, the station and the PCP can alternatively utilize one of the traffic types specified by a TID field 436 to request/acknowledge an SP-SP period.

Figure 22:
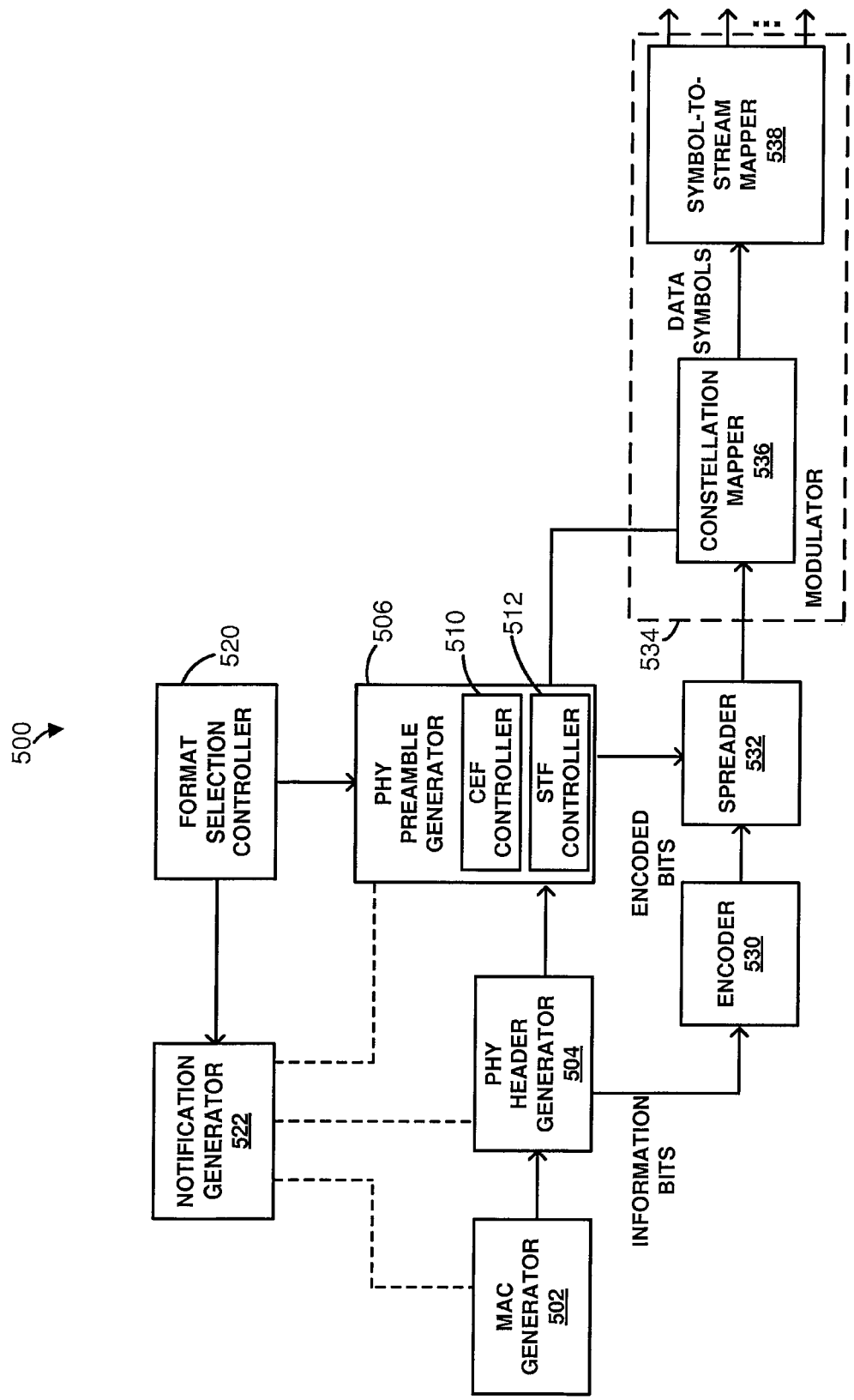
FIG. 22 is a block diagram of a transmitting device capable of transmitting short-preamble PHY data units and the corresponding indications according to an embodiment of the present disclosure.
Figure 23:
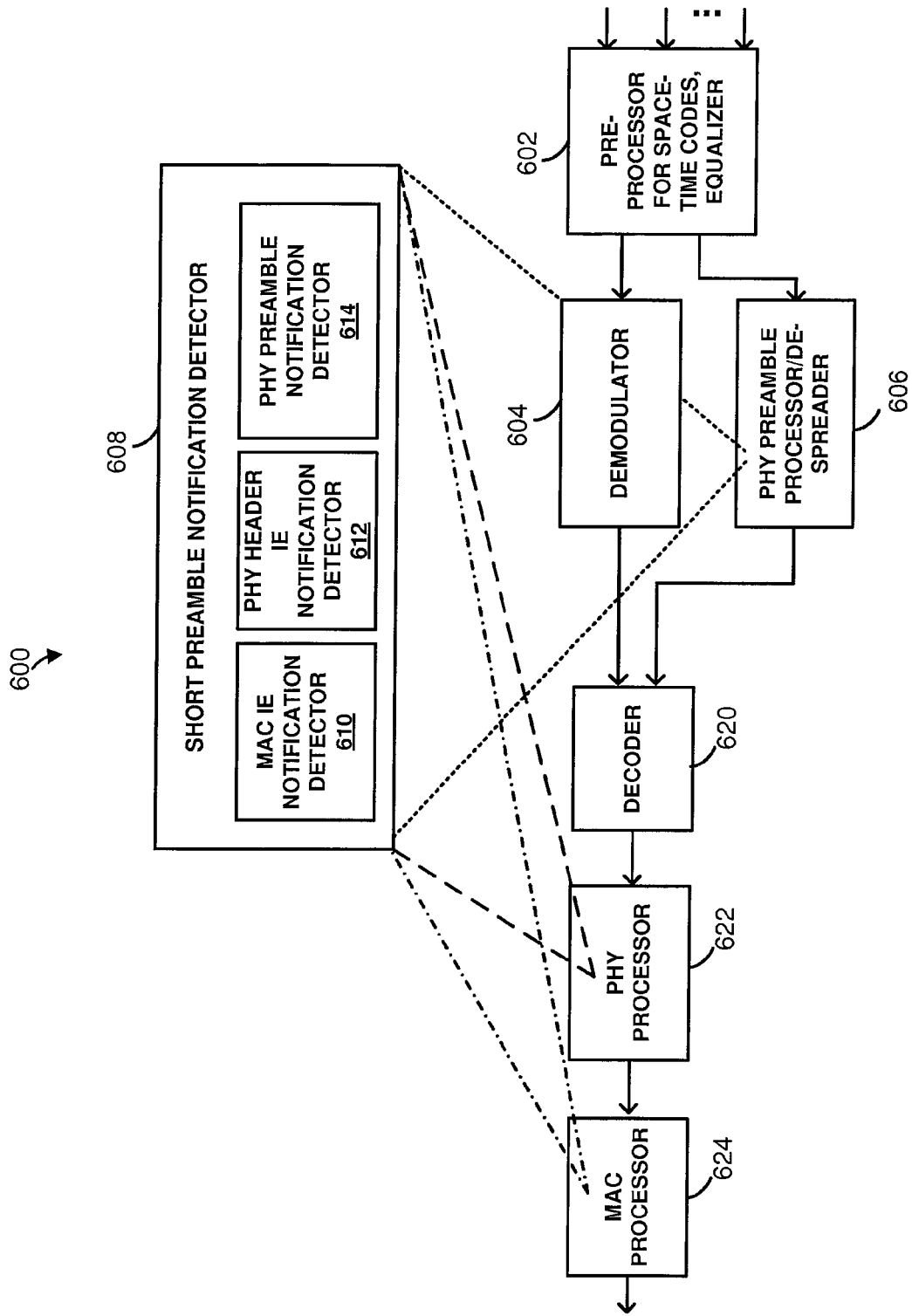
FIG. 23 is a block diagram of a receiving device capable of processing short-preamble PHY data units and the corresponding indications according to an embodiment of the present disclosure.

Next, FIGS. 22 and 23 illustrate, in relevant part, respective example architectures of a transmitting device and a receiving device that support the preamble formats and the notification mechanisms discussed above. Each of the transmitting device and the receiving device of FIGS. 22 and 23 can be implemented using hardware, software instructions executed by a processor, firmware instructions executed by a processor, or any combination thereof.

FIG. 22 is a block diagram of an example transmitting device 500, according to an embodiment. The transmitting device 500 generally converts a sequence of information bits into signals appropriate for transmission through a wireless channel (e.g., channel 16 of FIG. 1). More specifically, the transmitting device 500, in this embodiment, includes a MAC generator 502 to generate MAC information and format the MAC header of a data unit, a PHY header generator 504 to format the PHY header of the data unit, a PHY preamble generator 506 to generate the PHY preamble of the data unit. The PHY preamble generator 506 includes an STF controller 510 to control which sequence or sequences (e.g., Ga, Gb) should be applied to the STF field of the preamble, the number of sequences to be applied (i.e., determine the length of the STF as measured in symbols), etc. The PHY preamble generator 506 further includes a CEF controller 512 to control which CES symbols (e.g., Gu, Gv) should be used in the CEF field of the preamble, the relative order of the CES symbols, the length of the CEF field, etc.

The transmitting device 500 further includes a format selection controller 520 communicatively coupled to the PHY preamble generator 506. The format selection controller 520 determines which format to apply to a PHY data unit depending on whether the PHY data unit is being used for control (e.g., as a beacon, as a beamforming training packet) or for data (e.g., to convey application data to another station), as well as in view of the factors discussed above, e.g., proximity to the network device to which the PHY data unit is being transmitted, state of beamforming, etc. In an embodiment, the format selection controller 520 selects between the formats illustrated in FIGS. 4 and 5 and one of FIGS. 6-9.

The format selection controller 520 is also coupled to a notification generator 522. In some embodiments, the notification generator 522 is coupled to the MAC generator 502 so that a short preamble PHY request is included in the MAC header of the packet currently being formatted. In some embodiments, a regular PHY data unit conforms to one of the formats illustrated in FIGS. 15-21, for example. In other embodiments, the notification generator 522 is coupled to the PHY header generator 504 so that the short preamble PHY request is included in the PHY header. In some embodiments, a regular PHY data unit conforms to the format of FIG. 14, for example. In yet other embodiments, the notification generator 522 is coupled to the PHY preamble generator 506 so that the short preamble PHY request is included in the PHY preamble, or so that the PHY preamble identifies the packet including the preamble as a short-preamble regular PHY packet. In some embodiments, a regular PHY data unit conforms to the formats of FIG. 5 or one of 7 or 9, for example, depending on whether a short preamble is being transmitted.

With continued reference to FIG. 22, the transmitting device 500 further includes an encoder 530 (e.g., a convolution encoder) that encodes information bits, a spreader 532 that converts each encoded bit to a sequence of chips (e.g., Ga, Gb), and a modulator 534 that modulates the encoded chips into data symbols, which are mapped and converted to signals appropriate for transmission via one or more transmit antennas. In general, the modulator 534 implements any suitable modulation techniques based on one or more of phase shift keying, binary phase-shift keying (BPSK), $\pi/2$ BPSK (in which modulation is rotated by $\pi/2$ for each symbol or chip so that the maximum phase shift between adjacent symbols/chips is reduced from 180° to 90°), quadrature phase-shift keying (QPSK), $\pi/2$ QPSK, frequency modulation, amplitude modulation, quadrature amplitude modulation (QAM), $\pi/2$ QAM, on-off keying, minimum-shift keying, Gaussian minimum-shift keying, dual alternative mark inversion (DAMI), etc. In an embodiment, the modulator 534 includes a bit-to-symbol mapper 536 that maps encoded bits into symbols, and a symbol-to-stream mapper 538 that maps the symbols into multiple parallel streams. If only one transmit antenna is utilized, the symbol-to-stream mapper 538 can be omitted. Information is transmitted in data units such as frames or packets.

In some embodiments, the transmitting device 500 also includes various additional modules that, for purposes of clarity and conciseness, are not illustrated in FIG. 22. For example, the transmitting device 500 includes an interleaver that interleaves the encoded bits to mitigate burst errors, according to an embodiment. The transmitting device 500 further includes a radio frequency (RF) front end for performing frequency upconversion, various filters, power amplifiers, and so on, according to various embodiments.

FIG. 23 is a block diagram of an example receiving device 600, according to an embodiment. The receiving device 600 includes a pre-processor for space-time codes and equalizer 602 coupled to one or more receive antennas (not shown), a demodulator 604, and a PHY preamble processor/despreader 606 that includes a short preamble notification detector 608 in some embodiments of the receiving device 600. In these embodiments, the preamble notification detector 608 includes one or more of a MAC notification detector 610 configured to detect a short preamble PHY request in the MAC layer of a received PHY packet, a PHY header IE notification header detector 612 configured to detect a short preamble PHY request in the PHY header of the received PHY packet, and a PHY preamble notification header detector 614 configured to detect a short preamble PHY request in the PHY preamble of the PHY packet being received (or, in some embodiments, to detect whether the PHY packet being received is a short-preamble PHY packet). In other embodiments, the short preamble notification detector 608 includes only one of the modules 610-614 if, for example, the communication protocol supports notifications related to short-preamble PHY packets in one of the portions of a packet only.

The receiving device 600 further includes a decoder 620 that decodes information bits, a PHY processor 622 to process information elements in the PHY header or another portion of the received PHY packet, and a MAC processor 624 to process information elements in the MAC header of the received PHY packet. As illustrated by the dashed and dotted lines in FIG. 23, in some embodiments, some or all of the short preamble notification detector 608 is disposed in the PHY processor 622; and in some embodiments, some or all of the short preamble notification detector 608 is disposed in the MAC processor 624. Also, it will be understood that the receiving device 600 includes other components such as filters, analog-to-digital converters, etc., according to various embodiments, that are omitted from FIG. 23 for the purposes of clarity and conciseness.

Figure 24:
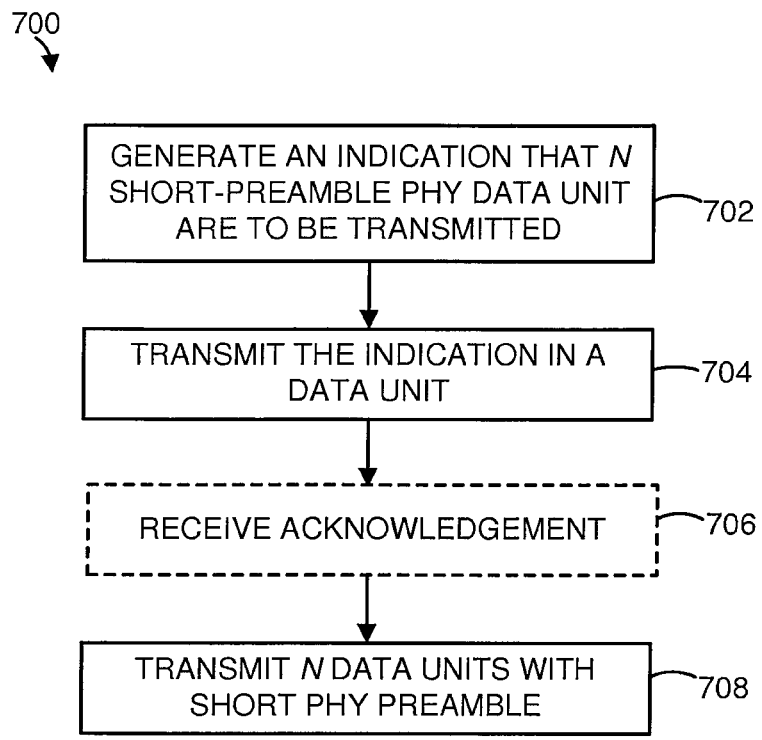
FIG. 24 is a flow diagram of a method for transmitting one or several short-preamble PHY data units according to an embodiment of the present disclosure.
Figure 25:
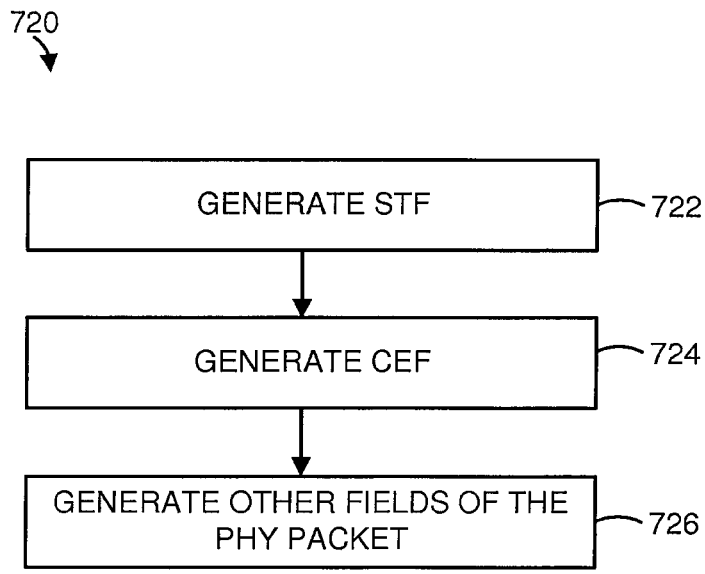
FIG. 25 is a flow diagram of a method for generating a short-preamble PHY data unit according to another embodiment of the present disclosure.
Figure 26:
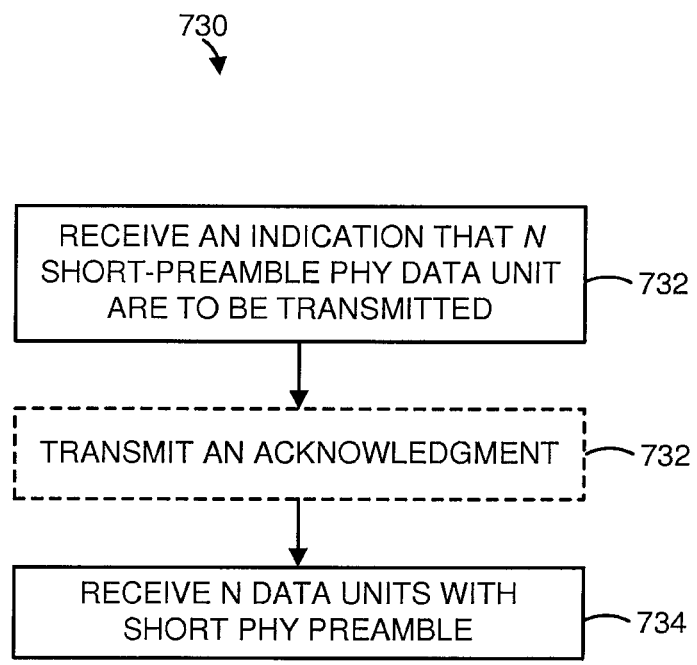
FIG. 26 is a flow diagram of a method for receiving one or several short-preamble PHY data units according to an embodiment of the present disclosure.

Now referring to FIGS. 24-26, at least some of the components illustrated in FIGS. 22 and 23 implement the example methods 700, 720, and 730. For example, the format selection controller 520 implement some of the steps of the method 700, according to an embodiment, to generate a short regular PHY preamble notification to be included in a regular PHY packet; and the notification generator 522 along with the PHY preamble generator 506 illustrated in FIG. 22 implement some of the other steps of the method 700, according to an embodiment, to transmit one or more short-preamble regular PHY packets. Further, the CEF controller 510 and the STF controller 512, in cooperation with the format selection controller 520 and the spreader 532, implement the method 720, according to an embodiment, to format the preamble of a short-preamble regular PHY packet. Still further, the short preamble notification generator 608 implements some of the steps of the method 730, according to an embodiment, to process a short preamble PHY request or a similar notification.

Referring first to FIG. 24, at block 702, an indication (e.g., a short preamble PHY request) that N short-preamble regular PHY data units (packets) are intended for transmission is generated. As discussed above, the indication in other embodiments does not specify the number of packets, and instead applies to the current service period or, as another alternative, prospectively to a future service period to be scheduled. At block 704, the notification is transmitted to a receiving station or to the PCP. To this end, the transmitting device can utilize a regular PHY packet conforming to the format of FIG. 5, for example. Optionally, the transmitting device receives a positive acknowledgement (block 706) prior to transmitting short-preamble regular PHY packets to the target station or the PCP.

Referring now to FIG. 25, the STF of a preamble is generated at block 722. As discussed above, the STF in a short-preamble regular PHY packet includes a smaller number of iterations of a spreading sequence in at least some of the embodiments (see, for example, FIGS. 6-9). Next, the CEF is generated at block 724. In an embodiment, the CEF is shorter (e.g., include fewer chips) than the corresponding STF of a regular PHY preamble. The rest of the packet (e.g., a PHY header, a MAC header, a payload) is generated at block 726.

The notification generated using the method 700 and one or several packets generated using the method 710 are processed as illustrated in FIG. 26, according to an embodiment. At block 732, a notification such as the short preamble PHY request discussed above is received. The notification in one embodiment is received from a peer station during a "general purpose" service period. In another embodiment, the notification is received from the PCP, and applies either to the current service period or to an SP-SP.

In an embodiment, an acknowledgement is transmitted at block 732. In another embodiment, the block 732 is omitted. The N packets are then received at block 734. As indicated above, block 734 can correspond to the same service period in which the notification is received or to a dedicated service period (e.g., an SP-SP).

From the foregoing, it will be appreciated that various embodiments of a method for transmitting a data unit having a short PHY preamble are disclosed. In one embodiment, communication devices can use a first format of a data unit to communicate beamforming and other control information and/or to communicate data at baseline rate and/or modulation scheme, a second format to communicate data (e.g., information at the MAC layer or above) under some physical conditions, and a third format to communicate data (e.g., information at the MAC layer or above) under certain suitable physical conditions (e.g., close proximity of the communicating devices, high beamforming gain). In each of the first format, second format, and the third format, a data unit includes a PHY preamble that precedes the rest of the data unit (e.g., a PHY header, a MAC header), but the third format specifies a shorter (i.e., a having a smaller number of symbols) preamble than the second format.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method for generating a PHY data unit, the method comprising:
   generating, in a wireless communication system including communication devices that utilize physical layer (PHY) data units that conform to a first format to communicate information associated with a layer of a protocol stack above a media access channel (MAC) layer, a first indication that a plurality of PHY data units conforming to a second format will be transmitted,
      the first format being associated with a first number of symbols in a preamble,
      the second format being associated with a second number of symbols in the preamble and the second number being smaller than the first number,
      the plurality of PHY data units including the PHY data unit,
      the first indication being indicative of a number of PHY data units included in the plurality of PHY data units and conforming to the second format, and
      the number of PHY data units included in the plurality of PHY data units and conforming to the second format being greater than one;
   transmitting the first indication;
   receiving an acknowledgement including a second indication that the plurality of PHY data units conforming to the second format will be accepted;
   generating a preamble of the PHY data unit, wherein the preamble includes a second number of symbols, wherein the second number is smaller than the first number; and
   generating another portion of the PHY data unit.

2. The method of claim 1, wherein generating the preamble of the PHY data unit includes:

generating a short training field (STF) using a smaller number of repetitions of a spreading sequence relative to the first format; and
generating a channel estimation field (CEF).

3. The method of claim 1, wherein generating the preamble of the PHY data unit includes:
generating an STF; and
generating a CEF using a smaller number of channel estimation sequence (CES) symbols relative to the first format.

4. The method of claim 1, wherein the first format is associated with an STF that is generating using a first spreading sequence; and wherein generating the preamble of the PHY data unit includes generating an STF using a second spreading sequence, wherein the first spreading sequence and the second spreading sequence are complementary sequences.

5. The method of claim 1, wherein the second format is used in response to detecting at least one of:
a beamforming gain that exceeds a first threshold;
a distance between a transmitter of the PHY data unit and a receiver of the PHY data unit that is lower than a second threshold;
an acceptable signal-to-noise ratio;
an acceptable bit error rate; or
an acceptable packet error rate.

6. The method of claim 1, further comprising:
generating a regular PHY data unit including the first indication, wherein the regular PHY data unit conforms to the first format; and
transmitting the regular PHY data unit prior to transmitting the plurality of PHY data units.

7. The method of claim 6, wherein the first indication is included in a field in a PHY header of the regular PHY data unit.

8. The method of claim 6, wherein the first indication is included in a field in a MAC header of the regular PHY data unit.

9. The method of claim 6, wherein the first indication is included in one of a piconet basic service set (PBSS) transmission specification (TSPEC) information element or a PBSS schedule information element.

10. The method of claim 6,
wherein the second indication is received from a peer device; and
the method further comprises causing the PHY data unit to be transmitted to the peer device when the PHY data unit can be accepted at the peer device.

11. The method of claim 1, further comprising
including the first indication in a first PHY data unit to be transmitted of the plurality of PHY data units conforming to the second format.

12. The method of claim 1, further comprising:
generating a request to allocate a service period (SP) within which one or more data units conforming to the second format can be transmitted; and
causing the request to be transmitted to a piconet central point (PCP).

13. A communication device comprising:
a physical layer (PHY) preamble generator configured to generate a preamble of a regular PHY data unit applying one of a first format and a second format, wherein the first format includes a first number of symbols and a second format includes a second number of symbols, and wherein the second number is smaller than the first number; and
a format selection controller configured to:

receive a first indication that a plurality of PHY data units conforming to the second format will be accepted and a second indication of a service period (SP), the first indication and the second indication transmitted by another communication device, the SP being a time period during which short preambles are to be used by the communication device, the second indication of the SP received during an allotment time (AT) period, and the AT being a time period for announcing timeslot allocation and scheduling information,
select one of the first format and the second format in response to the reception of the second indication of the service period, wherein the format selection controller is configured to select the second format during the service period, and cause the PHY preamble generator to apply the selected one of the first format and the second format,
wherein the communication device utilizes regular physical layer data units to exchange data with other communication devices in a wireless communication system and control PHY data units to exchange control information with the other communication devices.

14. The communication device of claim 13, wherein the format selection controller is configured to:
select the second format in response to detecting one of:
a full beamforming gain;
an acceptable distance between the communication device and another communication device to which the regular PHY data unit is transmitted;
an acceptable signal-to-noise ratio;
an acceptable bit error rate; or
an acceptable packet error rate.

15. The communication device of claim 13, further comprising:
a short training field (STF) controller configured to:
cause the PHY preamble generator to use a first number of repetitions of a spreading sequence in an STF field when applying the first format; and
cause the PHY preamble generator to use a second number of repetitions of the spreading sequence or another spreading sequence in the STF field when applying the second format;
wherein the second number is lower than the first number.

16. The communication device of claim 13, further comprising:
a short training field (STF) controller configured to:
generate an STF field of the preamble using a first spreading sequence to indicate that the regular PHY conforms to the first format; and
generate the STF field of the preamble using a second spreading sequence to indicate that the regular PHY conforms to the second format;
wherein the first spreading sequence and the second spreading sequence are complementary sequences.

17. The communication device of claim 13, wherein the PHY preamble generator includes a channel estimation field (STF) controller configured to:
use a first number of channel estimation sequence (CES) symbols in an STF field when applying the first format; and
use a second number of CES symbols in the STF field when applying the second format;
wherein the second number is lower than the first number.

18. The communication device of claim 13, further comprising a notification generator configured to generate a third indication that one or more regular PHY data units conforming to the second format will be transmitted, wherein the third indication is included in a regular PHY data unit conforming to the first format.

19. The communication device of claim 18, further comprising a MAC generator configured to generate a MAC header of the regular PHY data unit conforming to the first format, wherein the third indication is included in a field of the MAC header.

20. The communication device of claim 18, further comprising a PHY header generator configured to generate a PHY header of the regular PHY data unit conforming to the first format, wherein the third indication is included in a field of the PHY header.

21. A method for processing a physical layer (PHY) data unit, the method comprising:
receiving, in a wireless communication system that utilizes physical layer (PHY) data units that conform to a first format and PHY data units that conform to the second format to communicate information associated with a layer of a protocol stack above a media access channel (MAC) layer, a first indication that a plurality of PHY data units that conform to the second format will be transmitted,
the first format being associated with a first number of symbols in a preamble,
the second format being associated with a second number of symbols in the preamble and the second number being smaller than the first number,
the first indication being indicative of a number of PHY data units that are included in the plurality of PHY data units and that conform to the second format, the number of PHY data units being greater than one, and
the plurality of PHY data units including the PHY data unit that conforms to the second format;
causing an acknowledgment to be transmitted in response to receiving the first indication, including generating a second indication that the PHY data unit that conforms to the second format will be transmitted and including the second indication in the acknowledgement;
processing the PHY data unit that conforms to the second format in accordance with the second format; and
utilizing PHY information elements in another portion of the PHY data unit that conforms to the second format to perform a PHY function.

22. The method of claim 21, further comprising:
processing a PHY data unit that conforms to the first format received prior to the plurality of PHY data units that conform to the second format; and
wherein the PHY data unit that conforms to the first format includes the first indication.

23. The method of claim 22, wherein the first indication is included in one of:
a PHY preamble of the PHY data unit that conforms to the first format;
a PHY header of the PHY data unit that conforms to the first format; or
a MAC header of the PHY data unit that conforms to the first format.

24. The method of claim 21, wherein the preamble of the PHY data unit that conforms to the second format includes the first indication.

25. The method of claim 21, wherein the acknowledgement is included in one of:
a PHY header of a PHY data unit that conforms to the first format; or
a MAC header of the PHY data unit that conforms to the first format.

26. A communication device comprising:
a notification detector configured to:
(i) process a first indication that a plurality of physical layer (PHY) data units that conform to a first format will be transmitted to the communication device,
the communication device for use in a wireless communication system that utilizes PHY data units that conform to the first format and PHY data units that conform to a second format to communicate information associated with a layer of a protocol stack above a media access channel (MAC) layer,
the first format associated with a first number of symbols in a preamble, and
the second format associated with a second number of symbols in the preamble and the first number being smaller than the second number,
the first indication being indicative of a number of PHY data units that are included in the plurality of PHY data units that conform to the first format, and
the number of PHY data units being greater than one; and
(ii) generate a second indication included in an acknowledgement that is to be transmitted in response to the first indication, the second indication that a PHY data unit that conforms to the first format will be transmitted; and
a PHY processor configured to process the plurality of PHY data units according to the first format;
wherein the communication device utilizes an information element in a PHY data unit included in the plurality of PHY data units to perform a communication function, and wherein the information element is in a portion of the PHY data unit that follows a preamble of the PHY data unit.

27. The communication device of claim 26, wherein the PHY data unit is a first PHY data unit; wherein the notification detector includes at least one of:
a MAC IE notification detector configured to detect the first indication in a MAC header of a second PHY data unit, wherein the second PHY data unit conforms to the second format and is processed prior to the first PHY data unit;
a PHY header IE notification detector configured to detect the first indication in a PHY header of the second PHY data unit; or
a PHY preamble notification detector configured to detect the first indication in the preamble of the first PHY data unit or in a preamble of the second PHY data unit.

* * * * *